United States Patent
Walton et al.

(10) Patent No.: US 8,711,763 B2
(45) Date of Patent: *Apr. 29, 2014

(54) RANDOM ACCESS FOR WIRELESS MULTIPLE-ACCESS COMMUNICATION SYSTEMS

(75) Inventors: Jay Rodney Walton, Carlisle, MA (US); John W. Ketchum, Harvard, MA (US); Mark S. Wallace, Bedford, MA (US); Steven J. Howard, Ashland, MA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/353,924

(22) Filed: Jan. 19, 2012

(65) Prior Publication Data

US 2012/0140664 A1 Jun. 7, 2012

Related U.S. Application Data

(63) Continuation of application No. 10/693,532, filed on Oct. 23, 2003, now Pat. No. 8,169,944.

(60) Provisional application No. 60/421,309, filed on Oct. 25, 2002, provisional application No. 60/432,440, filed on Dec. 10, 2002.

(51) Int. Cl.
*H04W 72/00* (2009.01)
*H04W 74/08* (2009.01)
*H04W 74/00* (2009.01)
*H04W 88/06* (2009.01)

(52) U.S. Cl.
CPC ........ *H04W 74/0833* (2013.01); *H04W 74/002* (2013.01); *H04W 88/06* (2013.01); *H04W 74/08* (2013.01)
USPC ........... 370/327; 370/235; 370/445; 445/445; 445/450

(58) Field of Classification Search
None
See application file for complete search history.

(56) References Cited

U.S. PATENT DOCUMENTS 4,736,371 A  4/1988 Tejima et al.
4,750,198 A  6/1988 Harper
(Continued)

FOREIGN PATENT DOCUMENTS

AU   2002259221   11/2002
CA    2690245 A1  10/2001
(Continued)

OTHER PUBLICATIONS

3GPP2 TIA/EIA/IS-2000.2-A, "Physical Layer Standard for cdma2000: Standards for Spread Spectrum Systems," (Mar. 2000), Telecommunications Industry Association, pp. 1-446.

(Continued)

*Primary Examiner* — Ian N Moore
*Assistant Examiner* — Brian T Le
(74) *Attorney, Agent, or Firm* — QUALCOMM IP Department; James Hunt Yancey, Jr.

(57) ABSTRACT

Techniques for facilitating random access in wireless multiple-access communication systems are described. A random access channel (RACH) is defined to comprise a "fast" RACH (F-RACH) and a "slow" RACH (S-RACH). The F-RACH and S-RACH can efficiently support user terminals in different operating states and employ different designs. The F-RACH can be used to quickly access the system, and the S-RACH is more robust and can support user terminals in various operating states and conditions. The F-RACH may be used by user terminals that have registered with the system and can compensate for their round trip delays (RTDs) by properly advancing their transmit timing. The S-RACH may be used by user terminals that may or may not have registered with the system, and may or may not be able to compensate for their RTDs. Other aspects, embodiments, and features are also claimed and described.

25 Claims, 12 Drawing Sheets

(56) References Cited

U.S. PATENT DOCUMENTS

| | | | |
|---|---|---|---|
| 4,797,879 A | 1/1989 | Habbab et al. | |
| 5,239,677 A | 8/1993 | Jasinski | |
| 5,241,544 A | 8/1993 | Jasper et al. | |
| 5,295,159 A | 3/1994 | Kerpez | |
| 5,404,355 A | 4/1995 | Raith | |
| 5,422,733 A | 6/1995 | Merchant et al. | |
| 5,471,647 A | 11/1995 | Gerlach et al. | |
| 5,479,447 A | 12/1995 | Chow et al. | |
| 5,491,837 A * | 2/1996 | Haartsen | 455/62 |
| 5,493,712 A | 2/1996 | Ramesh et al. | |
| 5,506,861 A | 4/1996 | Bottomley | |
| 5,509,003 A | 4/1996 | Snijders et al. | |
| 5,606,729 A | 2/1997 | Damico et al. | |
| 5,638,369 A | 6/1997 | Ayerst et al. | |
| 5,677,909 A | 10/1997 | Heide | |
| 5,729,542 A | 3/1998 | Dupont | |
| 5,790,550 A | 8/1998 | Peeters et al. | |
| 5,818,813 A | 10/1998 | Saito et al. | |
| 5,822,374 A | 10/1998 | Levin | |
| 5,832,387 A | 11/1998 | Bae et al. | |
| 5,859,875 A | 1/1999 | Kato et al. | |
| 5,867,478 A | 2/1999 | Baum et al. | |
| 5,867,539 A | 2/1999 | Koslov | |
| 5,883,887 A * | 3/1999 | Take et al. | 370/329 |
| 5,886,988 A | 3/1999 | Yun et al. | |
| 5,959,965 A | 9/1999 | Ohkubo et al. | |
| 5,973,638 A | 10/1999 | Robbins et al. | |
| 5,982,327 A | 11/1999 | Vook et al. | |
| 6,005,876 A | 12/1999 | Cimini, Jr. et al. | |
| 6,011,963 A | 1/2000 | Ogoro | |
| 6,049,548 A | 4/2000 | Bruno et al. | |
| 6,067,290 A | 5/2000 | Paulraj et al. | |
| 6,072,779 A | 6/2000 | Tzannes et al. | |
| 6,084,915 A | 7/2000 | Williams | |
| 6,097,771 A | 8/2000 | Foschini | |
| 6,115,354 A | 9/2000 | Weck | |
| 6,122,247 A | 9/2000 | Levin et al. | |
| 6,131,016 A | 10/2000 | Greenstein et al. | |
| 6,141,388 A | 10/2000 | Servais et al. | |
| 6,141,542 A | 10/2000 | Kotzin et al. | |
| 6,141,567 A | 10/2000 | Youssefmir et al. | |
| 6,144,711 A | 11/2000 | Raleigh et al. | |
| 6,154,661 A | 11/2000 | Goldburg | |
| 6,163,296 A | 12/2000 | Lier et al. | |
| 6,167,031 A | 12/2000 | Olofsson et al. | |
| 6,175,588 B1 | 1/2001 | Visotsky et al. | |
| 6,178,196 B1 | 1/2001 | Naguib et al. | |
| 6,192,256 B1 | 2/2001 | Whinnett | |
| 6,205,410 B1 | 3/2001 | Cai | |
| 6,222,888 B1 | 4/2001 | Kao et al. | |
| 6,232,918 B1 | 5/2001 | Wax et al. | |
| 6,266,528 B1 | 7/2001 | Farzaneh | |
| 6,275,543 B1 | 8/2001 | Petrus et al. | |
| 6,278,726 B1 | 8/2001 | Mesecher et al. | |
| 6,292,917 B1 | 9/2001 | Sinha et al. | |
| 6,298,035 B1 | 10/2001 | Heiskala | |
| 6,298,092 B1 | 10/2001 | Heath, Jr. et al. | |
| 6,308,080 B1 | 10/2001 | Burt et al. | |
| 6,314,113 B1 | 11/2001 | Guemas | |
| 6,314,289 B1 | 11/2001 | Eberlein et al. | |
| 6,317,612 B1 | 11/2001 | Farsakh | |
| 6,330,277 B1 | 12/2001 | Gelblum et al. | |
| 6,330,293 B1 | 12/2001 | Klank et al. | |
| 6,330,462 B1 | 12/2001 | Chen | |
| 6,333,953 B1 | 12/2001 | Bottomley et al. | |
| 6,339,399 B1 | 1/2002 | Andersson et al. | |
| 6,345,036 B1 | 2/2002 | Sudo et al. | |
| 6,346,910 B1 | 2/2002 | Ito | |
| 6,347,234 B1 | 2/2002 | Scherzer | |
| 6,348,036 B1 | 2/2002 | Looney et al. | |
| 6,351,499 B1 | 2/2002 | Paulraj et al. | |
| 6,363,267 B1 | 3/2002 | Lindskog et al. | |
| 6,369,758 B1 | 4/2002 | Zhang | |
| 6,377,812 B1 | 4/2002 | Rashid-Farrokhi et al. | |
| 6,385,264 B1 | 5/2002 | Terasawa et al. | |
| 6,426,971 B1 | 7/2002 | Wu et al. | |
| 6,452,981 B1 | 9/2002 | Raleigh et al. | |
| 6,463,290 B1 | 10/2002 | Stilp et al. | |
| 6,473,467 B1 | 10/2002 | Wallace et al. | |
| 6,478,422 B1 | 11/2002 | Hansen | |
| 6,492,942 B1 | 12/2002 | Kezys | |
| 6,510,184 B1 | 1/2003 | Okamura | |
| 6,512,737 B1 | 1/2003 | Agee | |
| 6,515,617 B1 | 2/2003 | Demers et al. | |
| 6,532,225 B1 | 3/2003 | Chang et al. | |
| 6,532,255 B1 | 3/2003 | Gunzelmann et al. | |
| 6,532,562 B1 | 3/2003 | Chou et al. | |
| 6,545,997 B1 | 4/2003 | Bohnke et al. | |
| 6,574,211 B2 | 6/2003 | Padovani et al. | |
| 6,574,267 B1 | 6/2003 | Kanterakis et al. | |
| 6,574,271 B2 | 6/2003 | Mesecher et al. | |
| 6,594,473 B1 | 7/2003 | Dabak et al. | |
| 6,594,798 B1 | 7/2003 | Chou et al. | |
| 6,597,682 B1 | 7/2003 | Kari | |
| 6,608,874 B1 | 8/2003 | Beidas et al. | |
| 6,611,231 B2 | 8/2003 | Crilly, Jr. et al. | |
| 6,615,024 B1 | 9/2003 | Boros et al. | |
| 6,631,121 B1 | 10/2003 | Yoon | |
| 6,636,496 B1 | 10/2003 | Cho et al. | |
| 6,636,568 B2 | 10/2003 | Kadous | |
| 6,654,590 B2 | 11/2003 | Boros et al. | |
| 6,654,613 B1 | 11/2003 | Maeng et al. | |
| 6,668,161 B2 | 12/2003 | Boros et al. | |
| 6,683,916 B1 | 1/2004 | Sartori et al. | |
| 6,690,660 B2 | 2/2004 | Kim et al. | |
| 6,693,992 B2 | 2/2004 | Jones et al. | |
| 6,694,155 B1 | 2/2004 | Chin et al. | |
| 6,697,346 B1 * | 2/2004 | Halton et al. | 370/335 |
| 6,711,121 B1 | 3/2004 | Gerakoulis et al. | |
| 6,728,233 B1 | 4/2004 | Park et al. | |
| 6,731,668 B2 | 5/2004 | Ketchum | |
| 6,735,188 B1 | 5/2004 | Becker et al. | |
| 6,738,020 B1 | 5/2004 | Lindskog et al. | |
| 6,744,811 B1 | 6/2004 | Kantschuk | |
| 6,751,187 B2 | 6/2004 | Walton et al. | |
| 6,751,444 B1 | 6/2004 | Meiyappan | |
| 6,751,480 B2 | 6/2004 | Kogiantis et al. | |
| 6,757,263 B1 | 6/2004 | Olds | |
| 6,760,313 B1 | 7/2004 | Sindhushayana et al. | |
| 6,760,388 B2 | 7/2004 | Ketchum et al. | |
| 6,760,882 B1 | 7/2004 | Gesbert et al. | |
| 6,768,727 B1 | 7/2004 | Sourour et al. | |
| 6,771,706 B2 | 8/2004 | Ling et al. | |
| 6,785,341 B2 | 8/2004 | Walton et al. | |
| 6,785,513 B1 | 8/2004 | Sivaprakasam | |
| 6,788,948 B2 | 9/2004 | Lindskog et al. | |
| 6,792,041 B1 | 9/2004 | Kim et al. | |
| 6,795,424 B1 | 9/2004 | Kapoor et al. | |
| 6,798,738 B1 | 9/2004 | Do et al. | |
| 6,801,790 B2 | 10/2004 | Rudrapatna | |
| 6,802,035 B2 | 10/2004 | Catreux et al. | |
| 6,804,191 B2 | 10/2004 | Richardson | |
| 6,821,535 B2 | 11/2004 | Nurmi et al. | |
| 6,842,460 B1 * | 1/2005 | Olkkonen et al. | 370/465 |
| 6,847,828 B2 | 1/2005 | Miyoshi et al. | |
| 6,850,252 B1 | 2/2005 | Hoffberg | |
| 6,850,498 B2 | 2/2005 | Heath et al. | |
| 6,859,503 B2 | 2/2005 | Pautler et al. | |
| 6,862,271 B2 | 3/2005 | Medvedev et al. | |
| 6,862,440 B2 | 3/2005 | Sampath | |
| 6,868,079 B1 | 3/2005 | Hunt | |
| 6,873,651 B2 | 3/2005 | Tesfai et al. | |
| 6,879,578 B2 | 4/2005 | Pan et al. | |
| 6,879,579 B1 | 4/2005 | Myles et al. | |
| 6,882,868 B1 | 4/2005 | Shattil | |
| 6,885,708 B2 | 4/2005 | Thomas et al. | |
| 6,888,809 B1 | 5/2005 | Foschini et al. | |
| 6,888,899 B2 | 5/2005 | Raleigh et al. | |
| 6,891,858 B1 | 5/2005 | Mahesh et al. | |
| 6,920,192 B1 | 7/2005 | Laroia et al. | |
| 6,920,194 B2 | 7/2005 | Stopler et al. | |
| 6,927,728 B2 | 8/2005 | Vook et al. | |
| 6,937,592 B1 | 8/2005 | Heath, Jr. et al. | |
| 6,940,917 B2 | 9/2005 | Menon et al. | |

(56) References Cited

U.S. PATENT DOCUMENTS

| | | |
|---|---|---|
| 6,950,632 B1 | 9/2005 | Yun et al. |
| 6,952,426 B2 | 10/2005 | Wu et al. |
| 6,952,454 B1 | 10/2005 | Jalali et al. |
| 6,956,813 B2 * | 10/2005 | Fukuda .......................... 370/208 |
| 6,956,906 B2 | 10/2005 | Tager et al. |
| 6,959,171 B2 | 10/2005 | Tsien et al. |
| 6,963,742 B2 | 11/2005 | Boros et al. |
| 6,965,762 B2 | 11/2005 | Sugar et al. |
| 6,980,601 B2 | 12/2005 | Jones |
| 6,980,800 B2 | 12/2005 | Noerpel et al. |
| 6,985,434 B2 | 1/2006 | Wu et al. |
| 6,985,534 B1 | 1/2006 | Meister |
| 6,987,819 B2 | 1/2006 | Thomas et al. |
| 6,990,059 B1 | 1/2006 | Anikhindi et al. |
| 6,992,972 B2 | 1/2006 | Van Nee |
| 6,996,380 B2 | 2/2006 | Dent |
| 7,002,900 B2 | 2/2006 | Walton et al. |
| 7,003,044 B2 | 2/2006 | Subramanian et al. |
| 7,006,464 B1 | 2/2006 | Gopalakrishnan et al. |
| 7,006,483 B2 | 2/2006 | Nelson, Jr. et al. |
| 7,006,848 B2 | 2/2006 | Ling et al. |
| 7,009,931 B2 | 3/2006 | Ma et al. |
| 7,012,978 B2 | 3/2006 | Talwar |
| 7,020,110 B2 | 3/2006 | Walton et al. |
| 7,020,482 B2 | 3/2006 | Medvedev et al. |
| 7,020,490 B2 | 3/2006 | Khatri |
| 7,023,826 B2 | 4/2006 | Sjoberg et al. |
| 7,024,163 B1 | 4/2006 | Barratt et al. |
| 7,031,671 B2 | 4/2006 | Mottier |
| 7,035,359 B2 | 4/2006 | Molnar |
| 7,039,125 B2 | 5/2006 | Friedman |
| 7,042,858 B1 | 5/2006 | Ma et al. |
| 7,054,378 B2 | 5/2006 | Walton et al. |
| 7,058,367 B1 | 6/2006 | Luo et al. |
| 7,062,294 B1 | 6/2006 | Rogard et al. |
| 7,068,628 B2 | 6/2006 | Li et al. |
| 7,072,381 B2 | 7/2006 | Atarashi et al. |
| 7,072,410 B1 | 7/2006 | Monsen |
| 7,072,413 B2 | 7/2006 | Walton et al. |
| 7,088,671 B1 | 8/2006 | Monsen |
| 7,095,709 B2 | 8/2006 | Walton et al. |
| 7,095,722 B1 * | 8/2006 | Walke et al. ................... 370/315 |
| 7,099,377 B2 | 8/2006 | Berens et al. |
| 7,103,325 B1 | 9/2006 | Jia et al. |
| 7,110,378 B2 | 9/2006 | Onggosanusi et al. |
| 7,110,463 B2 | 9/2006 | Wallace et al. |
| 7,113,499 B2 | 9/2006 | Nafie et al. |
| 7,116,652 B2 | 10/2006 | Lozano |
| 7,120,199 B2 | 10/2006 | Thielecke et al. |
| 7,127,009 B2 | 10/2006 | Berthet et al. |
| 7,130,362 B2 | 10/2006 | Girardeau et al. |
| 7,133,459 B2 | 11/2006 | Onggosanusi et al. |
| 7,137,047 B2 | 11/2006 | Mitlin et al. |
| 7,149,239 B2 | 12/2006 | Hudson |
| 7,149,254 B2 | 12/2006 | Sampath |
| 7,151,809 B2 | 12/2006 | Ketchum et al. |
| 7,155,171 B2 | 12/2006 | Ebert et al. |
| 7,158,563 B2 | 1/2007 | Ginis et al. |
| 7,164,649 B2 | 1/2007 | Walton et al. |
| 7,164,669 B2 | 1/2007 | Li et al. |
| 7,184,713 B2 | 2/2007 | Kadous et al. |
| 7,187,646 B2 | 3/2007 | Schramm |
| 7,190,749 B2 | 3/2007 | Levin et al. |
| 7,191,381 B2 | 3/2007 | Gesbert et al. |
| 7,194,237 B2 | 3/2007 | Sugar et al. |
| 7,197,084 B2 | 3/2007 | Ketchum et al. |
| 7,200,404 B2 | 4/2007 | Panasik et al. |
| 7,206,354 B2 | 4/2007 | Wallace et al. |
| 7,218,684 B2 | 5/2007 | Bolourchi et al. |
| 7,221,956 B2 | 5/2007 | Medvedev et al. |
| 7,224,704 B2 | 5/2007 | Lu et al. |
| 7,231,184 B2 | 6/2007 | Eilts et al. |
| 7,233,625 B2 | 6/2007 | Ma et al. |
| 7,238,508 B2 | 7/2007 | Lin et al. |
| 7,242,727 B2 | 7/2007 | Liu et al. |
| 7,248,638 B1 | 7/2007 | Banister |
| 7,248,841 B2 | 7/2007 | Agee et al. |
| 7,254,171 B2 | 8/2007 | Hudson |
| 7,260,153 B2 | 8/2007 | Nissani |
| 7,260,366 B2 | 8/2007 | Lee et al. |
| 7,263,119 B1 | 8/2007 | Hsu et al. |
| 7,274,734 B2 | 9/2007 | Tsatsanis |
| 7,277,679 B1 | 10/2007 | Barratt et al. |
| 7,280,467 B2 | 10/2007 | Smee et al. |
| 7,280,625 B2 | 10/2007 | Ketchum et al. |
| 7,283,508 B2 | 10/2007 | Choi et al. |
| 7,289,570 B2 | 10/2007 | Schmidl et al. |
| 7,292,854 B2 | 11/2007 | Das et al. |
| 7,298,778 B2 | 11/2007 | Visoz et al. |
| 7,298,805 B2 | 11/2007 | Walton et al. |
| 7,308,035 B2 | 12/2007 | Rouquette et al. |
| 7,310,304 B2 | 12/2007 | Mody et al. |
| 7,317,750 B2 | 1/2008 | Shattil |
| 7,324,429 B2 | 1/2008 | Walton et al. |
| 7,327,800 B2 | 2/2008 | Oprea et al. |
| 7,333,556 B2 | 2/2008 | Maltsev et al. |
| 7,342,912 B1 | 3/2008 | Kerr et al. |
| 7,356,004 B2 | 4/2008 | Yano et al. |
| 7,356,089 B2 | 4/2008 | Jia et al. |
| 7,379,492 B2 | 5/2008 | Hwang |
| 7,386,076 B2 | 6/2008 | Onggosanusi et al. |
| 7,392,014 B2 | 6/2008 | Baker et al. |
| 7,403,748 B1 | 7/2008 | Keskitalo et al. |
| 7,421,039 B2 | 9/2008 | Malaender et al. |
| 7,453,844 B1 * | 11/2008 | Lee et al. ...................... 370/329 |
| 7,466,749 B2 | 12/2008 | Medvedev et al. |
| 7,480,278 B2 | 1/2009 | Pedersen et al. |
| 7,486,740 B2 | 2/2009 | Inanoglu |
| 7,492,737 B1 | 2/2009 | Fong et al. |
| 7,508,748 B2 | 3/2009 | Kadous |
| 7,548,506 B2 | 6/2009 | Ma et al. |
| 7,551,546 B2 | 6/2009 | Ma et al. |
| 7,551,580 B2 | 6/2009 | Du Crest et al. |
| 7,573,805 B2 | 8/2009 | Zhuang et al. |
| 7,599,443 B2 | 10/2009 | Ionescu et al. |
| 7,603,141 B2 | 10/2009 | Dravida |
| 7,606,296 B1 | 10/2009 | Hsu et al. |
| 7,606,319 B2 | 10/2009 | Zhang et al. |
| 7,623,871 B2 | 11/2009 | Sheynblat |
| 7,636,573 B2 | 12/2009 | Walton et al. |
| 7,653,142 B2 | 1/2010 | Ketchum et al. |
| 7,653,415 B2 | 1/2010 | Van Rooyen |
| 7,822,140 B2 | 10/2010 | Catreux et al. |
| 7,986,742 B2 | 7/2011 | Ketchum et al. |
| 8,145,179 B2 | 3/2012 | Walton et al. |
| 8,170,513 B2 | 5/2012 | Walton et al. |
| 8,254,246 B2 | 8/2012 | Ma et al. |
| 8,358,714 B2 | 1/2013 | Walton et al. |
| 8,406,118 B2 | 3/2013 | Ma et al. |
| 8,570,988 B2 | 10/2013 | Wallace et al. |
| 2001/0017881 A1 | 8/2001 | Bhatoolaul et al. |
| 2001/0031014 A1 | 10/2001 | Subramanian et al. |
| 2001/0031621 A1 | 10/2001 | Schmutz |
| 2001/0038666 A1 | 11/2001 | Mesecher et al. |
| 2001/0046205 A1 | 11/2001 | Easton et al. |
| 2001/0048675 A1 | 12/2001 | Nafie et al. |
| 2002/0003774 A1 | 1/2002 | Wang et al. |
| 2002/0004920 A1 | 1/2002 | Cho et al. |
| 2002/0018310 A1 | 2/2002 | Hung |
| 2002/0018453 A1 | 2/2002 | Yu et al. |
| 2002/0027951 A1 | 3/2002 | Gormley et al. |
| 2002/0034263 A1 | 3/2002 | Schmidl et al. |
| 2002/0041632 A1 | 4/2002 | Sato et al. |
| 2002/0041635 A1 | 4/2002 | Ma et al. |
| 2002/0044591 A1 | 4/2002 | Lee et al. |
| 2002/0044610 A1 | 4/2002 | Jones |
| 2002/0057659 A1 | 5/2002 | Ozluturk et al. |
| 2002/0062472 A1 | 5/2002 | Medlock et al. |
| 2002/0064214 A1 | 5/2002 | Hattori et al. |
| 2002/0071445 A1 | 6/2002 | Wu et al. |
| 2002/0072336 A1 | 6/2002 | Mottier |
| 2002/0075830 A1 | 6/2002 | Hartman, Jr. |
| 2002/0080735 A1 | 6/2002 | Heath et al. |
| 2002/0085620 A1 | 7/2002 | Mesecher |

(56) References Cited

U.S. PATENT DOCUMENTS

| | | |
|---|---|---|
| 2002/0085641 A1 | 7/2002 | Baum |
| 2002/0098872 A1 | 7/2002 | Judson |
| 2002/0105928 A1 | 8/2002 | Kapoor et al. |
| 2002/0115473 A1 | 8/2002 | Hwang et al. |
| 2002/0122381 A1 | 9/2002 | Wu et al. |
| 2002/0122393 A1 | 9/2002 | Caldwell et al. |
| 2002/0126803 A1 | 9/2002 | Jones et al. |
| 2002/0127978 A1 | 9/2002 | Khatri |
| 2002/0132600 A1 | 9/2002 | Rudrapatna |
| 2002/0147953 A1 | 10/2002 | Catreux et al. |
| 2002/0150182 A1 | 10/2002 | Dogan et al. |
| 2002/0154705 A1 | 10/2002 | Walton et al. |
| 2002/0155818 A1 | 10/2002 | Boros et al. |
| 2002/0163879 A1 | 11/2002 | Li et al. |
| 2002/0163974 A1 | 11/2002 | Friedman |
| 2002/0181390 A1 | 12/2002 | Mody et al. |
| 2002/0183010 A1 | 12/2002 | Catreux et al. |
| 2002/0184453 A1 | 12/2002 | Hughes et al. |
| 2002/0191535 A1 | 12/2002 | Sugiyama et al. |
| 2002/0193146 A1 | 12/2002 | Wallace et al. |
| 2002/0196842 A1 | 12/2002 | Onggosanusi et al. |
| 2003/0002450 A1 | 1/2003 | Jalali et al. |
| 2003/0003863 A1 | 1/2003 | Thielecke et al. |
| 2003/0003880 A1 | 1/2003 | Ling et al. |
| 2003/0012308 A1 | 1/2003 | Sampath et al. |
| 2003/0016640 A1 | 1/2003 | Onggosanusi et al. |
| 2003/0039317 A1 | 2/2003 | Taylor et al. |
| 2003/0043732 A1 | 3/2003 | Walton et al. |
| 2003/0043887 A1 | 3/2003 | Hudson |
| 2003/0043929 A1 | 3/2003 | Sampath |
| 2003/0045288 A1 | 3/2003 | Luschi et al. |
| 2003/0048856 A1 | 3/2003 | Ketchum et al. |
| 2003/0060173 A1 | 3/2003 | Lee et al. |
| 2003/0064739 A1 | 4/2003 | Lindskog et al. |
| 2003/0076797 A1 | 4/2003 | Lozano |
| 2003/0076812 A1 | 4/2003 | Benedittis |
| 2003/0078024 A1 | 4/2003 | Magee et al. |
| 2003/0086514 A1 | 5/2003 | Ginis et al. |
| 2003/0092456 A1 | 5/2003 | Dent |
| 2003/0095197 A1 | 5/2003 | Wheeler et al. |
| 2003/0099306 A1 | 5/2003 | Nilsson et al. |
| 2003/0103584 A1 | 6/2003 | Bjerke et al. |
| 2003/0108117 A1 | 6/2003 | Ketchum et al. |
| 2003/0112745 A1 | 6/2003 | Zhuang et al. |
| 2003/0112880 A1 | 6/2003 | Walton et al. |
| 2003/0119452 A1 | 6/2003 | Kim et al. |
| 2003/0123381 A1 | 7/2003 | Zhuang et al. |
| 2003/0123389 A1 | 7/2003 | Russell et al. |
| 2003/0125040 A1 | 7/2003 | Walton et al. |
| 2003/0128656 A1 | 7/2003 | Scarpa |
| 2003/0128658 A1 | 7/2003 | Walton et al. |
| 2003/0139194 A1 | 7/2003 | Onggosanusi et al. |
| 2003/0139196 A1 | 7/2003 | Medvedev et al. |
| 2003/0142732 A1 | 7/2003 | Moshavi et al. |
| 2003/0147371 A1 | 8/2003 | Choi et al. |
| 2003/0153273 A1 | 8/2003 | Ebert et al. |
| 2003/0153320 A1 | 8/2003 | Noerpel et al. |
| 2003/0153360 A1 | 8/2003 | Burke et al. |
| 2003/0157953 A1 | 8/2003 | Das et al. |
| 2003/0157954 A1 | 8/2003 | Medvedev et al. |
| 2003/0161282 A1 | 8/2003 | Medvedev et al. |
| 2003/0162519 A1 | 8/2003 | Smith et al. |
| 2003/0165187 A1 | 9/2003 | Tesfai et al. |
| 2003/0165189 A1 | 9/2003 | Kadous |
| 2003/0185309 A1 | 10/2003 | Pautler et al. |
| 2003/0185310 A1 | 10/2003 | Ketchum et al. |
| 2003/0185311 A1 | 10/2003 | Kim |
| 2003/0186650 A1 | 10/2003 | Liu |
| 2003/0189972 A1 | 10/2003 | Berens et al. |
| 2003/0190897 A1 | 10/2003 | Lei et al. |
| 2003/0202492 A1 | 10/2003 | Akella et al. |
| 2003/0202612 A1 | 10/2003 | Halder et al. |
| 2003/0206558 A1 | 11/2003 | Parkkinen et al. |
| 2003/0223391 A1 | 12/2003 | Malaender et al. |
| 2003/0231706 A1 | 12/2003 | Hwang |
| 2003/0235147 A1 | 12/2003 | Walton et al. |
| 2003/0235149 A1 | 12/2003 | Chan et al. |
| 2003/0235255 A1 | 12/2003 | Ketchum et al. |
| 2003/0236080 A1 | 12/2003 | Kadous et al. |
| 2004/0005887 A1 | 1/2004 | Bahrenburg et al. |
| 2004/0013084 A1 | 1/2004 | Thomas et al. |
| 2004/0017785 A1 | 1/2004 | Zelst |
| 2004/0037257 A1 | 2/2004 | Ngo |
| 2004/0042439 A1 | 3/2004 | Menon et al. |
| 2004/0042556 A1 | 3/2004 | Medvedev et al. |
| 2004/0047292 A1 | 3/2004 | Du Crest et al. |
| 2004/0052228 A1 | 3/2004 | Tellado et al. |
| 2004/0062192 A1 | 4/2004 | Liu et al. |
| 2004/0071104 A1 | 4/2004 | Boesel et al. |
| 2004/0071107 A1 | 4/2004 | Kats et al. |
| 2004/0076224 A1 | 4/2004 | Onggosanusi et al. |
| 2004/0081131 A1 | 4/2004 | Walton et al. |
| 2004/0082356 A1 | 4/2004 | Walton et al. |
| 2004/0085939 A1 | 5/2004 | Wallace et al. |
| 2004/0087324 A1 | 5/2004 | Ketchum et al. |
| 2004/0095907 A1 | 5/2004 | Agee et al. |
| 2004/0120411 A1 | 6/2004 | Walton et al. |
| 2004/0136349 A1 | 7/2004 | Walton et al. |
| 2004/0151108 A1 | 8/2004 | Blasco Claret et al. |
| 2004/0151122 A1 | 8/2004 | Lau et al. |
| 2004/0156328 A1 | 8/2004 | Walton et al. |
| 2004/0160987 A1 | 8/2004 | Sudo et al. |
| 2004/0165684 A1 | 8/2004 | Ketchum et al. |
| 2004/0176097 A1 | 9/2004 | Wilson et al. |
| 2004/0179627 A1 | 9/2004 | Ketchum et al. |
| 2004/0184398 A1 | 9/2004 | Walton et al. |
| 2004/0198276 A1 | 10/2004 | Tellado et al. |
| 2004/0203853 A1 | 10/2004 | Sheynblat |
| 2004/0252632 A1 | 12/2004 | Bourdoux et al. |
| 2005/0047384 A1 | 3/2005 | Wax et al. |
| 2005/0047515 A1 | 3/2005 | Walton et al. |
| 2005/0088959 A1 | 4/2005 | Kadous |
| 2005/0099974 A1 | 5/2005 | Kats et al. |
| 2005/0111599 A1 | 5/2005 | Walton et al. |
| 2005/0120097 A1 | 6/2005 | Walton et al. |
| 2005/0124297 A1 | 6/2005 | Eilts et al. |
| 2005/0128953 A1 | 6/2005 | Wallace et al. |
| 2005/0135284 A1 | 6/2005 | Nanda et al. |
| 2005/0135295 A1 | 6/2005 | Walton et al. |
| 2005/0135318 A1 | 6/2005 | Walton et al. |
| 2005/0147177 A1 | 7/2005 | Seo et al. |
| 2005/0152465 A1 | 7/2005 | Maltsev et al. |
| 2005/0185575 A1 | 8/2005 | Hansen et al. |
| 2005/0195915 A1 | 9/2005 | Raleigh et al. |
| 2005/0208959 A1 | 9/2005 | Chen et al. |
| 2005/0220211 A1 | 10/2005 | Shim et al. |
| 2005/0227628 A1 | 10/2005 | Inanoglu |
| 2005/0245264 A1* | 11/2005 | Laroia et al. .................. 455/445 |
| 2005/0276343 A1 | 12/2005 | Jones |
| 2006/0002496 A1 | 1/2006 | Wallace et al. |
| 2006/0018247 A1 | 1/2006 | Driesen et al. |
| 2006/0018395 A1 | 1/2006 | Tzannes |
| 2006/0039275 A1 | 2/2006 | Walton et al. |
| 2006/0067417 A1 | 3/2006 | Park et al. |
| 2006/0072649 A1 | 4/2006 | Chang et al. |
| 2006/0077935 A1 | 4/2006 | Hamalainen et al. |
| 2006/0104196 A1 | 5/2006 | Wu et al. |
| 2006/0104340 A1 | 5/2006 | Walton et al. |
| 2006/0114858 A1 | 6/2006 | Walton et al. |
| 2006/0153237 A1 | 7/2006 | Hwang et al. |
| 2006/0159120 A1 | 7/2006 | Kim |
| 2006/0176968 A1 | 8/2006 | Keaney et al. |
| 2006/0183497 A1 | 8/2006 | Paranchych et al. |
| 2006/0209894 A1 | 9/2006 | Tzannes et al. |
| 2006/0209937 A1 | 9/2006 | Tanaka et al. |
| 2007/0086536 A1 | 4/2007 | Ketchum et al. |
| 2007/0177681 A1 | 8/2007 | Choi et al. |
| 2007/0274278 A1 | 11/2007 | Choi et al. |
| 2008/0069015 A1 | 3/2008 | Walton et al. |
| 2008/0267098 A1 | 10/2008 | Walton et al. |
| 2008/0267138 A1 | 10/2008 | Walton et al. |
| 2008/0285488 A1 | 11/2008 | Walton et al. |
| 2008/0285669 A1 | 11/2008 | Walton et al. |
| 2008/0285670 A1 | 11/2008 | Walton et al. |

(56) References Cited

U.S. PATENT DOCUMENTS

| | | |
|---|---|---|
| 2009/0129454 A1 | 5/2009 | Medvedev et al. |
| 2009/0291642 A1 | 11/2009 | Cozzo et al. |
| 2010/0067401 A1 | 3/2010 | Medvedev et al. |
| 2010/0119001 A1 | 5/2010 | Walton et al. |
| 2010/0142636 A1 | 6/2010 | Heath, Jr. et al. |
| 2010/0183088 A1 | 7/2010 | Inanoglu |
| 2010/0208841 A1 | 8/2010 | Walton et al. |
| 2010/0260060 A1 | 10/2010 | Abraham et al. |
| 2010/0271930 A1 | 10/2010 | Tong et al. |
| 2011/0216808 A1 | 9/2011 | Tong et al. |
| 2011/0235744 A1 | 9/2011 | Ketchum et al. |
| 2012/0176928 A1 | 7/2012 | Wallace et al. |
| 2013/0235825 A1 | 9/2013 | Walton et al. |
| 2013/0279614 A1 | 10/2013 | Walton et al. |

FOREIGN PATENT DOCUMENTS

| | | |
|---|---|---|
| CA | 2690247 | 10/2001 |
| CN | 1086061 | 4/1994 |
| CN | 1234661 | 11/1999 |
| CN | 1298266 A | 6/2001 |
| CN | 1308794 | 8/2001 |
| CN | 1314037 A | 9/2001 |
| CN | 1347609 A | 5/2002 |
| CN | 1469662 | 1/2004 |
| CN | 1489836 A | 4/2004 |
| CN | 1537371 | 10/2004 |
| DE | 19951525 A1 | 6/2001 |
| EP | 0755090 A1 | 1/1997 |
| EP | 0762701 | 3/1997 |
| EP | 0772329 | 5/1997 |
| EP | 0805568 A1 | 11/1997 |
| EP | 0869647 A2 | 10/1998 |
| EP | 0895387 A1 | 2/1999 |
| EP | 0929172 A1 | 7/1999 |
| EP | 0951091 A2 | 10/1999 |
| EP | 0991221 A2 | 4/2000 |
| EP | 0993211 | 4/2000 |
| EP | 1061446 | 12/2000 |
| EP | 1075093 | 2/2001 |
| EP | 1087545 A1 | 3/2001 |
| EP | 1117197 A2 | 7/2001 |
| EP | 1126673 A2 | 8/2001 |
| EP | 1133070 | 9/2001 |
| EP | 1137217 | 9/2001 |
| EP | 1143754 A1 | 10/2001 |
| EP | 1170879 A1 | 1/2002 |
| EP | 1175022 A2 | 1/2002 |
| EP | 1182799 A2 | 2/2002 |
| EP | 1185001 | 3/2002 |
| EP | 1185015 | 3/2002 |
| EP | 1185048 A2 | 3/2002 |
| EP | 1207635 A1 | 5/2002 |
| EP | 1207645 A1 | 5/2002 |
| EP | 1223702 A1 | 7/2002 |
| EP | 1241824 | 9/2002 |
| EP | 1265411 | 12/2002 |
| EP | 1315311 A1 | 5/2003 |
| EP | 1379020 | 1/2004 |
| EP | 1387545 | 2/2004 |
| EP | 1416688 A1 | 5/2004 |
| EP | 1447934 A1 | 8/2004 |
| EP | 1556984 A2 | 7/2005 |
| GB | 2300337 | 10/1996 |
| GB | 2373973 A | 10/2002 |
| JP | 1132027 | 5/1989 |
| JP | 03104430 | 5/1991 |
| JP | 06003956 | 1/1994 |
| JP | 6501139 T | 1/1994 |
| JP | 8274756 A | 10/1996 |
| JP | 9135230 | 5/1997 |
| JP | 9266466 | 10/1997 |
| JP | 9307526 A | 11/1997 |
| JP | 09327073 | 12/1997 |
| JP | 9512156 | 12/1997 |
| JP | 10028077 | 1/1998 |
| JP | 10051402 A | 2/1998 |
| JP | 10084324 | 3/1998 |
| JP | 10209956 A | 8/1998 |
| JP | 10303794 A | 11/1998 |
| JP | 10327126 | 12/1998 |
| JP | 1141159 | 2/1999 |
| JP | 11069431 A | 3/1999 |
| JP | 11074863 A | 3/1999 |
| JP | 11163823 A | 6/1999 |
| JP | 11205273 | 7/1999 |
| JP | 11252037 A | 9/1999 |
| JP | 11317723 A | 11/1999 |
| JP | 2991167 | 12/1999 |
| JP | 2000068975 A | 3/2000 |
| JP | 2000078105 | 3/2000 |
| JP | 2000092009 A | 3/2000 |
| JP | 2001044930 A | 2/2001 |
| JP | 200186045 | 3/2001 |
| JP | 2001103034 A | 4/2001 |
| JP | 2001186051 A | 7/2001 |
| JP | 2001510668 A | 7/2001 |
| JP | 2001217896 | 8/2001 |
| JP | 2001231074 | 8/2001 |
| JP | 2001237751 A | 8/2001 |
| JP | 200264879 | 2/2002 |
| JP | 2002504283 | 2/2002 |
| JP | 200277098 | 3/2002 |
| JP | 200277104 | 3/2002 |
| JP | 2002111627 | 4/2002 |
| JP | 2002118534 A | 4/2002 |
| JP | 2002510932 A | 4/2002 |
| JP | 2002514033 A | 5/2002 |
| JP | 2002164814 | 6/2002 |
| JP | 2002176379 A | 6/2002 |
| JP | 2002204217 | 7/2002 |
| JP | 2002232943 A | 8/2002 |
| JP | 2003504941 | 2/2003 |
| JP | 2003198442 | 7/2003 |
| JP | 2003530010 | 10/2003 |
| JP | 2004266586 | 9/2004 |
| JP | 2004297172 | 10/2004 |
| JP | 2004535694 | 11/2004 |
| JP | 2005519520 | 6/2005 |
| JP | 2006504372 | 2/2006 |
| JP | 4860925 | 11/2011 |
| KR | 200011799 | 2/2000 |
| KR | 20010098861 | 11/2001 |
| KR | 1020020003370 | 1/2002 |
| KR | 20030085040 | 11/2003 |
| KR | 20060095576 A | 8/2006 |
| RU | 2015281 C1 | 6/1994 |
| RU | 2111619 | 5/1998 |
| RU | 2134489 | 8/1999 |
| RU | 2139633 | 10/1999 |
| RU | 2141168 | 11/1999 |
| RU | 2146418 C1 | 3/2000 |
| RU | 2149509 | 5/2000 |
| RU | 2152132 | 6/2000 |
| RU | 2157592 | 10/2000 |
| RU | 2158479 C2 | 10/2000 |
| RU | 2168277 | 5/2001 |
| RU | 2168278 | 5/2001 |
| RU | 2197781 C2 | 1/2003 |
| RU | 2201034 C2 | 3/2003 |
| RU | 2335852 C2 | 10/2008 |
| TW | 419912 | 1/2001 |
| TW | 200300636 | 6/2003 |
| TW | 545006 B | 8/2003 |
| TW | 583842 B | 4/2004 |
| TW | I230525 | 4/2005 |
| TW | I263449 | 10/2006 |
| TW | I267251 B | 11/2006 |
| WO | WO8607223 | 12/1986 |
| WO | 9210890 A1 | 6/1992 |
| WO | WO9307684 A1 | 4/1993 |
| WO | WO9507578 | 3/1995 |
| WO | WO-9516319 A1 | 6/1995 |

(56) References Cited

FOREIGN PATENT DOCUMENTS

| WO | 9521501 | A1 | 8/1995 |
|---|---|---|---|
| WO | WO9530316 | A1 | 11/1995 |
| WO | WO9532567 | A1 | 11/1995 |
| WO | WO9622662 | | 7/1996 |
| WO | WO9635268 | | 11/1996 |
| WO | 9702667 | | 1/1997 |
| WO | WO9719525 | A1 | 5/1997 |
| WO | WO9736377 | A1 | 10/1997 |
| WO | WO9809381 | | 3/1998 |
| WO | WO9809395 | | 3/1998 |
| WO | WO9824192 | A1 | 6/1998 |
| WO | WO9826523 | | 6/1998 |
| WO | WO9830047 | A1 | 7/1998 |
| WO | WO9857472 | | 12/1998 |
| WO | WO9903224 | | 1/1999 |
| WO | WO9914878 | | 3/1999 |
| WO | WO9916214 | | 4/1999 |
| WO | WO9929049 | A2 | 6/1999 |
| WO | WO9944379 | A1 | 9/1999 |
| WO | 9952224 | A1 | 10/1999 |
| WO | WO9957820 | | 11/1999 |
| WO | WO0011823 | A1 | 3/2000 |
| WO | WO0036764 | A2 | 6/2000 |
| WO | WO0062456 | | 10/2000 |
| WO | WO0105067 | A1 | 1/2001 |
| WO | WO0126269 | | 4/2001 |
| WO | 0163775 | A2 | 8/2001 |
| WO | WO0169801 | | 9/2001 |
| WO | WO0171928 | | 9/2001 |
| WO | WO0176110 | A2 | 10/2001 |
| WO | WO0180510 | A1 | 10/2001 |
| WO | WO0182521 | A2 | 11/2001 |
| WO | 0195531 | A2 | 12/2001 |
| WO | WO0197400 | | 12/2001 |
| WO | WO0201732 | A2 | 1/2002 |
| WO | WO0203557 | A1 | 1/2002 |
| WO | WO-0205506 | | 1/2002 |
| WO | WO0215433 | A1 | 2/2002 |
| WO | WO 0225853 | A2 | 3/2002 |
| WO | WO02060138 | | 8/2002 |
| WO | WO02062002 | A1 | 8/2002 |
| WO | WO02065664 | | 8/2002 |
| WO | WO02069523 | A1 | 9/2002 |
| WO | WO02069590 | A1 | 9/2002 |
| WO | WO02073869 | A1 | 9/2002 |
| WO | WO02075955 | | 9/2002 |
| WO | WO02078211 | A2 | 10/2002 |
| WO | WO02082689 | A2 | 10/2002 |
| WO | WO02088656 | | 11/2002 |
| WO | WO02093784 | A1 | 11/2002 |
| WO | WO02099992 | | 12/2002 |
| WO | WO03010984 | A1 | 2/2003 |
| WO | WO03010994 | A1 | 2/2003 |
| WO | WO03019984 | A1 | 3/2003 |
| WO | WO03028153 | | 4/2003 |
| WO | WO03034646 | A2 | 4/2003 |
| WO | WO03047140 | A1 | 6/2003 |
| WO | WO03075479 | A1 | 9/2003 |
| WO | WO04002011 | | 12/2003 |
| WO | WO04002047 | | 12/2003 |
| WO | WO2004038985 | A2 | 5/2004 |
| WO | WO2004038986 | A2 | 5/2004 |
| WO | WO2004039011 | | 5/2004 |
| WO | WO2004039022 | | 5/2004 |
| WO | WO2005041515 | | 5/2005 |
| WO | WO2005043855 | | 5/2005 |
| WO | WO2005046113 | A2 | 5/2005 |

OTHER PUBLICATIONS

Alamouti, S.M., "A Simple Transmit Diversity Technique for Wireless Communications," IEEE Journal on Select Areas in Communications, vol. 16, No. 8, Oct. 1998, pp. 1451-1458.

Bingham, John A.C.: "Multicarrier Modulation for Data Transmission: an Idea Whose Time Has Come," IEEE Communications Magazine, pp. 5-14 (May 1990).
Chen, K.C. et al., "Novel Space-Time Processing of DS/CDMA Multipath Signal," IEEE 49th, Vehicular Technology Conference, Houston, Texas, May 16-20, 1999, pp. 1809-1813.
Choi, R. et al., "MIMO Transmit Optimization for Wireless Communication Systems," Proceedings of the First IEEE International workshops on Electronic Design, pp. 1-6, Piscataway, New Jersey, Jan. 29-31, 2002.
Chung, J. et al: "Multiple antenna systems for 802.16 systems." IEEE 802.16 Broadband Wireless Access Working Group <http://ieee802.org/16>, IEEE 802.16abc-01/31, Sep. 7, 2001, pp. 1-5.
Co-pending U.S. Appl. No. 60/421,309, filed Oct. 25, 2002.
Co-pending U.S. Appl. No. 60/421,428, filed Oct. 25, 2002.
Deneire, Luc, et al.: "A Low Complexity ML Channel Estimator for OFDM," Proc IEEE ICC (Jun. 2001), pp. 1461-1465.
Diggavi, S. et al., "Intercarrier interference in MIMO OFDM," IEEE International Conference on Communications, (Aug. 2002), vol. 1, pp. 485-489, doi: 10.1109/ICC.2002.996901.
ETSI TS 101 761-1 v1.3.1, "Broadband Radio Access Networks (BRAN); HIPERLAN Type 2; Data Link Control (DLC) Layer; Part 1: Basic Data Transport Functions," ETSI Standards, European Telecommunications Standards Institute BR (V131), pp. 1-88 (Dec. 2001).
European Search Opinion, for EP Patent Application No. EP08006576, European Patent Office, filed on Nov. 16, 2008.
European Search Report—EP08012143.7, Search Authority—Munich Patent Office, Jan. 19, 2011.
European Search Report—EP09171254, Search Authority—The Hague Patent Office, Mar. 9, 2010.
European Search Report—EP10173988—Search Authority—Munich—Mar. 15, 2011.
European Search Report—EP10173988, Search Authority—Munich Patent Office, Jan. 14, 2011.
European Search Report—EP10174919—Search Authority—Munich—Apr. 11, 2012.
European Search Report—EP11153572—Search Authority—The Hague—Jul. 28, 2011.
European Search Report—EP11162015—Search Authority—Hague—Jul. 11, 2011.
European Search Report—EP11173875—Search Authority—Hague—Oct. 25, 2011.
European Search Report for EP Application No. EP10150225 filed on Feb. 25, 2010.
European Search Report for EP Patent Application No. EP05019630 filed on Nov. 16, 2005.
European Search Report for EP Patent Application No. EP05019631 filed on Nov. 30, 2005.
European Search Report for EP Patent Application No. EP08006576 filed on Jun. 16, 2008.
Fujii, M.: "Pseudo-Orthogonal Multibeam-Time Transmit Diversity for OFDM-CDMA" pp. 222-226 (2002).
G. Bauch, J. Hagenauer, "Smart Versus Dumb Antennas—Capacities and FEC Performance," IEEE Communications Letters, vol. 6, No. 2, pp. 55-57, Feb. 2002.
Gao, J. et al. "On implementation of Bit-Loading Algorithms for OFDM Systems with Multiple-Input Multiple Output," VTC 2002-Fall. 2002 IEEE 56th. Vehicular Technology Conference Proceedings. Vancouver, Canada, (Sep. 24-28, 2002), IEEE Vehicular Technology Conference, pp. 199-203.
Gore, D. A., et al.: "Selecting an optimal set of transmit antennas for a low rank matrix channel," 2000 IEEE International Conference on Acoustics, Speech, and Signal Processing. Proceedings. (ICASSP). Istanbul, Turkey, Jun. 5-9, 2000, New York, NY; IEEE, US, vol. 5 of 6, (Jun. 5, 2000), pp. 2785-2788, XP001035763, abstract.
Grunheid, R. et al., "Adaptive Modulation and Multiple Access for the OFDM Transmission Technique," Wireless Personal Communications 13: May 13, 2000, 2000 Kluwer Academic Publishers, pp. 4-13, XP000894156.
Hassibi, B. et al., "High Rate Codes That Are Linear in Space and Time," Lucent Technologies, 2002, pp. 1-55.

(56) References Cited

OTHER PUBLICATIONS

Haustein, T. et al.: "Performance of MIMO Systems with Channel Inversion," IEEE 55th Vehicular Technology Conference, Birmingham, Alabama, May 6-9, 2002, pp. 35-39.
Hayashi, K. et al.: "A New Spatio-Temporal Equalization Method Based on Estimated Channel Response," Sep. 2001, IEEE Transactions on Vehicular Technology, vol. 50, No. 5, pp. 1250-1259.
Heath, et al., "Multiuser diversity for MIMO wireless systems with linear receivers," Conference Record of the 35th Asilomar Conference on Signals, Systems, and Computers, 2001, Pacific Grove, CA, vol. 2, Nov. 4-7, 2001, pp. 1194-1199, XP010582229.
Hong, D. K. et al.: "Robust Frequency Offset Estimation for Pilot Symbol Assisted Packet CDMA with MIMO Antenna Systems," IEEE Communications Letters, vol. 6, No. 6, pp. 262-264, XP-001133262 (Jun. 2002).
IEEE Std 802.11a-1999 (Supplement to IEEE Std 801.11-1999) "Part 11: Wireless LAN Medium Access Control (MAC) and Physical Layer (PHY) specifications: High-Speed physical Layer in the 5GHZ Band", pp. 1-90, Sep. 1999.
International Preliminary Exam Report for PCT Application No. PCT-US03-034517, International Search Authority European Patent Office filed on Mar. 14, 2005.
International Preliminary Exam Report for PCT Application No. PCT-US2003-034568, International Search Authority, European Patent Office filed on Nov. 24, 2006.
International Preliminary Examination Report—PCT/US03/034519, IPEA/US—Aug. 31, 2004.
International Preliminary Examination Report for Application No. PCT-US03 026395, IPEA-US filed on Dec. 20, 2004.
International Preliminary Examination Report for PCT Application No. PCT-US03-033905, filed on Oct. 18, 2004.
International Preliminary Examination Report for PCT Application No. PCT-US03-034567, International Preliminary Examining Authority, United States, filed on Apr. 17, 2006.
International Preliminary Examination Report for PCT application No. PCT-US03- 034570. IPEA-US filed on Feb. 16, 2007.
International Preliminary Examination Report on Patentability for Application No. PCT-US2004-038198, International Preliminary Examining Authority filed on Feb. 18, 2006.
International Preliminary Report on Patentability for PCT Application No. PCT-US03-034565, International Preliminary Examining Authority, Alexandria, VA, USA, filed on Sep. 15, 2008.
International Preliminary Report on Patentability for PCT Application No. PCT-US06-003203 The International Bureau of WIPO, Geneva, Switzerland filed on Jul. 31, 2007.
International Preliminary Report on Patentability—PCT/US06/023515—The International Bureau of WIPO—Geneva, Switzerland, Dec. 17, 2007.
International Search Report—PCT/US2003/034520—International Search Authority, European Patent Office, Jun. 11, 2004.
International Search Report—PCT/US2003/34517, International Search Authority, European Patent Office, Apr. 27, 2004.
International Search Report and Written Opinion—PCT/US2006/017992, International Search Authority—European Patent Office—Aug. 24, 2007.
International Search Report for PCT Application No. PCT-US03-033905, International Search Authority European Patent Office filed on Jun. 2, 2004.
International Search Report for PCT Application No. PCT-US03-034515 International Search Authority European Patent Office filed on Jun. 17, 2004.
International Search Report for PCT Application No. PCT-US03-034567, International Search Authority, European Patent Office filed on Apr. 27, 2004.
International Search Report for PCT Application No. PCT-US06-003203, International Search Authority, European Patent Office filed on Aug. 29, 2006.
International Search Report for PCT Application No. PCT-US2003-034514 , International Search Authority , European Patent Office filed on May 12, 2005.
International Search Report for PCT Application No. PCT-US2004-038198,International Search Authority, European Patent Office filed on Apr. 4, 2005.
International Search Report PCT Application No. PCT-US03-033907, International Search Authority, European Patent Office, filed on Aug. 23, 2004.
International Search Report PCT Application No. PCT-US03-034565, International Search Authority, European Patent Office, filed on Jun. 4, 2004.
International Search Report PCT Application No. PCT-US03-034568, International Search Authority, European Patent Office filed on Jun. 4, 2004.
International Search Report PCT Application No. PCT-US03-034570, International Search Authority, European Patent Office, filed on Jun. 17, 2004.
International Search Report PCT-US03-026395, International Search Authority, Euoropean Patent Office Dec. 19, 2003.
International Search Report, PCT/US03/034519—International Search Authority—European Patent Office—Jul. 8, 2004.
International Search Report—PCT/US04/008665, International Search Authority—European Patent Office—Oct. 6, 2004.
International Search Report—PCT/US06/23515—International Search Authority/US, Dec. 18, 2006.
Iserte, P., et al., "Joint beamforming strategies in OFDM-MIMO systems," Acoustics, Speech, and Signal Processing, 1993. ICASSP-93., 1993 IEEE International Conference on , vol. 3, sections 2-3, Apr. 27-30, 1993, doi: 10.1109/ICASSP.2002.1005279.
Joham, M. et al.: "Symbol Rate Processing for the Downlink of DS-CDMA Systems", IEEE Journal on Selected Areas in Communications, vol. 19, No. 1, paragraphs 1, 2; IEEE Service Center, Piscataway, US, (Jan. 1, 2001), XP011055296, ISSN: 0733-8716.
Jongren, G. et al.: "Utilizing Quantized Feedback Information in Orthogonal Space-Time Block Coding," 2000 IEEE Global Telecommunications Conference, 2(4): 995-999, Nov. 27, 2000.
Kiessling, M. et al., "Short-term and long-term diagonalization of correlated MIMO channels with adaptive modulation" IEEE International Symposium on Personal, Indoor and Mobile Radio Communications, vol. 2, Sep. 15, 2002, pp. 593-597.
Kousa M, et al., "Multichannel Adaptive System", IEEE Proceedings I. Solid-State & Electron Devices, Institution of Electrical Engineers. Stevenage, GB, vol. 140, No. 5, Part 1, Oct. 1, 1993, pp. 357-364, XP000403498, ISSN: 0956-3776.
Le Goff, S. et al: "Turbo-codes and high spectral efficiency modulation," IEEE International Conference on Communications, 1994. ICC "94, Supercomm/ICC "94, Conference Record, 'Serving Humanity Through Communications.' pp. 645-649, vol. 2, May 1-5, 1994, XP010126658, doi: 10.1109/ICC.1994.368804.
Lebrun G., et al., "MIMO transmission over a time varying TDD channel using SVD," Electronics Letters, 2001, vol. 37, pp. 1363-1364.
Li, Lihua, et al., "A practical space-frequency block coded OFDM scheme for fast fading broadband channels," 2002. The 13th IEEE International Symposium on Personal, Indoor and Mobile Radio communications, vol. 1, Sep. 15-18, 2002.pp. 212-216 vol. 1.
Li, Ye et. al., "Simplified Channel Estimation for OFDM Systems with Multiple Transmit Antennas," IEEE Transactions on Wireless Communications, Jan. 2002, vol. 1, No. 1, pp. 67-75.
Miyashita, K. et al: "High data-rate transmission with eigenbeamspace division multiplexing (E-SDM) in a MIMO channel," VTC 2002—Fall. 2002 IEEE 56th. Vehicular Technology Conference Proceedings. Vancouver, Canada, Sep. 24-28, 2002, IEEE Vehicular Technology Conference, New York, NY: IEEE, US, vol. vol. 1 of 4. Conf. 56, (Sep. 24, 2002), pp. 1302-1306, XP010608639.
Office Action dated Aug. 13, 2008 for Australian Application Serial No. 2004223374, 2 pages.
Office Action dated Jun. 27, 2008 for Chinese Application Serial No. 200480011307.6, 3 pages.
Partial European Search Report—EP10012069—Search Authority—The Hague—Nov. 29, 2011.
Partial European Search Report—EP10012070—Search Authority—The Hague—Nov. 29, 2011.
Partial European Search Report—EP111523572—Search Authority—Hague—Jul. 28, 2011.

(56) References Cited

OTHER PUBLICATIONS

Partial European Search Report—EP11173875—Search Authority—Hague—Aug. 18, 2011.
Pautler, J. et al.: "On Application of Multiple-Input Multiple-Output Antennas to CDMA Cellular Systems," IEEE 54th Vehicular Technology Conference Proceedings, Atlantic City, New Jersey, Oct. 7-11, 2001, pp. 1508-1512.
Sampath, H., et al., "Joint transmit and receive optimization for high data rate wireless communication using multiple antennas," Signals, Systems, and Computers, 1999. Conference Record of the Thirty-Third Asilomar Conference, Oct. 24, 1999, XP010373976, pp. 215-219, IEEE, Piscataway, NJ, US.
Singapore Search Report—SG20104266-1—Hungary Intellectual Patent Office—Sep. 8, 2011.
Song, Bong-Gee et al., "Prefilter design using the singular value decomposition for MIMO equalization," 1996 Conference Record of the Thirtieth Asilomar Conference on Signals, Systems and Computers, vol. 1, pp. 34-38, Nov. 3-6, 1996, XP010231388, DOI: 10.1109/ACSSC.1996.600812, p. 35, col. 2, paragraph 4 through p. 36, col. 1.
Supplementary European Search Report—EP06759443—Search Authority—Hague—Nov. 24, 2011.
Supplementary European Search Report—EP06785006, Search Authority—The Hague Patent Office, Jul. 11, 2013.
Taiwan Search Report—TW093135893—TIPO—Jul. 6, 2011.
Taiwan Search Report—TW095103565—TIPO—Jan. 12, 2012.
Taiwan Search Report—TW095121422—TIPO—May 20, 2011.
Taiwanese Search report—TW092129777—TIPO—Mar. 6, 2010.
Taiwanese Search Report for Application No. 092129800, TIPO, filed on Apr. 6, 2010.
Taiwanese Search Report for Application No. 092129820 TIPO filed on Apr. 16, 2010.
Taiwanese Search Report for Application No. 092129817, TIPO filed on Oct. 31, 2010.
Tarighat, A. et al. "Performance Analysis of Different Algorithms for cdma2000 Antenna Array System and a New Multi User Beamforming (MUB) Algorithm", Wireless Communications and Networking Conference, vol. 1, pp. 409-414, Sep. 23, 2000.
The Authoritative Dictionary of IEEE Standards Terms, Seventh Edition, IEEE Press: New York (Dec. 2000), p. 902.
Theon, S. et al.: "Improved Adaptive Downlink for OFDM/SDMA-Based Wireless Networks," IEEE VTS 53rd Vehicular Technology Conference, pp. 707-711, Rhodes, Greece, May 6-9, 2001.
Translation of Office Action in Canadian Application 2501634 corresponding to U.S. Appl. No. 10/610,446, citing CA2690247 dated Feb. 25, 2011.
Translation of Office Action in Japanese Application 2005-501686 corresponding to U.S. Appl. No. 10/375,162, citing JP09135230 dated Feb. 15, 2011.
Tujkovic, D.: "High bandwidth efficiency space-time turbo coded modulation", Institute of Electrical and Electronics Engineers, ICC 2001. 2001 IEEE International Conference on Communications, Conference Record, pp. 1104-1109, Helsinki, Finland, Jun. 11-14, 2001.
Van Zelst, A. et al.: "Space Division Multiplexing (SDM) for OFDM Systems," IEEE 51st Vehicular Technology Conference Proceedings, pp. 1070-1074, Tokyo, Japan, May 15-18, 2000.
Vook, F. W. et al., "Adaptive antennas for OFDM", Vehicular Technology Conference, vol. 1, May 18-21, 1998, pp. 606-610, XP010287858, New York, NY, USA, IEEE, US DOI: 10.1109/VETEC.1998.686646 ISBN: 978-0-7803-4320-7.
Wales, S.W. "A mimo technique within the UTRA TDD standard," MIMO: Communications Systems from Concept to Implementations (Ref. No. 2001/175), IEE Seminar on, (Dec. 12, 2001), pp. 1-8., London, UK.
Warner, W. et al.: "OFDM/FM Frame Synchronization for Mobile Radio Data Communication", IEEE Transactions on Vehicular Technology, Aug. 1993, vol. 42, No. 3, pp. 302-313.
Wolniansky, P.W.; Foschini, G.J.; Golden, G.D.; Valenzuela, R.A.;, "V-BLAST: an architecture for realizing very high data rates over the rich-scattering wireless channel," Signals, Systems, and Electronics, 1998. ISSSE 98. 1998 URSI International Symposium, pp. 295-300, (Sep. 29-Oct. 2, 1998), doi: 10.1109/ISSSE.1998.738086.
Wong, et al., "Multiuser OFDM With Adaptive Subcarrier, Bit, and Power Allocation," Oct. 1999, IEEE Journal on Selected Areas in Communications, vol. 17, No. 10, pp. 1747-1758.
Wong K. K., et al., "Optimizing time and space MIMO antenna system for frequency selective fading channels," IEEE Journal on Selected Areas in Communications, vol. 19, No. 7, Jul. 2001, Sections II and III and V, 1396, pp. 1395-1407.
Written Opinion for PCT Application for No. PCT-US06-003203, International Search Authority, European Patent Office filed on Aug. 29, 2006.
Written Opinion for PCT Application No. PCT-US03-034570, IPEA-US filed on Aug. 11, 2006.
Written Opinion for PCT Application No. PCT-US2004 038198, International Search Authority, European Patent Office filed on Apr. 4, 2005.
Written Opinion—PCT/US04/008665, International Search Authority—European Patent Office—Oct. 6, 2004.
Written Opinion—PCT/US06/23515—International Search Authority/US, Dec. 18, 2006.
Wyglinski, Alexander. "Physical Layer Loading Algorithms for Indoor Wireless Multicarrier Systems," Thesis Paper, McGill University, Montreal, Canada, Nov. 2004, p. 109.
Yoshiki, T., et al., "A Study on Subcarrier Adaptive Demodulation System using Multilevel Transmission Power Control for OFDM/FDD System," The Institute of Electronics, Information and Communications Engineers general meeting, lecture collection, Japan, Mar. 7, 2000, Communication 1, p. 400.
3 rd Generation Partnership Project (3GPP); Technical Specification Group (TSG); Radio Access Network (RAN); RF requirements f o r 1.28Mcps UTRA TDD option, 3GPP Standard; 3G TR 25.945, 3rd Generation Partnership Project (3GPP), Mobile Competence Centre ; 650, Route Des Lucioles ; F-06921 Sophia-Antipolis Cedex; France, No. V2.0.0, Dec. 20, 2000, pp. 1-144, XP050400193, [retreived on Dec. 20, 2000], p. 126.
3rd Generation Partnership Project ; Technical Specification Group Radio Access Network; Radio Resource Control (RRC); Protocol Specifiation (Release 5 ), 3GPP Standard; 3GPP TS 25.331, 3rd Generation Partnership Project (3GPP), Mobile Competence Centre ; 650, Route Des Lucioles ; F-06921 Sophia-Antipolis Cedex; France, No. V5.2.0, Sep. 1, 2002, pp. 1-938, XP050367950, pp. 124, 358-370.
"3rd Generation Partnership Project ; Technical Specification Group Radio Access 6-18, Network; Physical channels and mapping of 21-24 transport channels onto physical channels (TDD) (Release 5 )", 3GPP Standard; 3GPP TS 25.221, 3rd Generation Partnership Project (3GPP), Mobile Competence Centre ; 650, Route Des Lucioles ; F-06921 Sophia-Antipolis Cedex ; France, No. V5.2.0, Sep. 1, 2002, pp. 1-97, XP050366967.
Catreux S., et al., "Simulation results for an interference-limited multiple input multiple output cellular system"., Global Telecommmunications letters . IEEE: U.S.A. Nov. 2000. vol. 4(11), pp. 334-336.
Co-pending U.S. Appl. No. 07/624,118, filed Dec. 7, 1990.
Nogueroles R., et al., "Performance of a random OFDMA system for mobile communications", Broadband Communications, 1998. Accessing, Transmission, Networking. Proceedings. 1998 International Zurich Seminar on Zurich, Switzerland Feb. 17-19, 1998, New York , NY, USA , IEEE, US, Feb. 17, 1998, pp. 37-43, XP010277032 , DOI : 10.1109/IZSBC.1998.670242 ISBN: 978-07803-3893-7, p. 1-2.
Sakaguchi et al, "Comprehensive Calibration for MIMO System", International Symposium on Wireless Personal Multimedia Communications, IEEE, vol. 2, Oct. 27, 2002, pp. 440-443.
Sampath et al., "A Fourth-Generation MIMO-OFDM Broadband Wireless System: Design, Performance and Field Trial Results", IEEE Communications Magazine, Sep. 1, 2002, pp. 143-149, vol. 40, No. 9, IEEE Service Center, XP011092922, ISSN: 0163-6804, DOI: 10.1109/MCOM.2002.1031841.
Varanasi M.K, et al., "Optimum decision feedback multiuser equalization with successive decoding achieves the total capacity of the Gaussian multiple-access channel", Signals, Systems & Computers,

(56) References Cited

OTHER PUBLICATIONS

1997. Conference Record of the Thirty-First Asilomar Conference on Pacific Grove, CA, USA Nov. 2-5, 1997, Los Alamitos, CA, USA,IEEE Comput. Soc, US, vol. 2, Nov. 2, 1997, pp. 1405-1409 , XP010280667, DOI: 10.1109/ACSSC.1997 . 679134 ISBN : 978-0-8186-8316-9 pp. 1,3,5; figures 1,3.

Coleri, S. et al: "Channel Estimation Techniques Based on Pilot Arrangement in OFDM Systems," IEEE Transactions on Broadcasting, Sep. 1, 2002, pp. 223-229, vol. 48, No. 3, IEEE Service Center, XP011070267, ISSN: 0018-9316.

Harada H., et al., "An OFDM-Based Wireless ATM Transmission System Assisted by a Cyclically ExtendedPN Sequence for Future Broad-BandMobile Multimedia Communications", IEEE Transactions on Vehicular Technology, IEEE Service Center, Piscataway, NJ, US, vol. 50, No. 6, Nov. 1, 2001, XP011064321, ISSN: 0018-9545.

Louvigne J.C., et al., "Experimental study of a real-time calibration procedure of a CDMA/TDD multiple antenna terminal," IEEE Antennas and Propagation Society International Symposium, 2002 DIGEST.APS.San Antonio, TX, Jun. 16-21, 2002,vol. 2, Jun. 16, 2002, pp. 644-647, XP010591780, DOI: 10.1109/APS.2002. 1016729, ISBN: 978-0-7803-7330-3.

Yamamura, T et al., "High Mobility OFDM transmission system by a new channel estimation and ISI cancellation scheme using characteristics of pilot symbol inserted OFDM signal"., Vehicular Technology Conference, vol. 1, Sep. 19-22, 1999, pp. 319-323, XP010352958 IEEE, Piscataway, NJ, USA, ISBN: 0-7803-5435-4.

Editor: 3GPP Draft; 3rd Generation Partnership Project (3GPP), Technical Specification Group (TSG) Radio Access Network (RAN); Working Group 4(WG4); base Station conformance and testing", TS 25.141 V0.1.1 (May 1999)", R4-99349, Mobile Competence Centre; 650, Route Des Lucioles; F-06921 Sophia-Antipolis Cedex; France, vol. RAN WG4, No. Miami; Oct. 24, 2001, XP050166323.

EPO Communication pursuant to Article 94(3) EPC issued by the European Patent Orifice for Application No. 10174926.5 dated Aug. 1, 2013.

EPO Communication pursuant to Article 94(3) EPC issued by the European Patent Orffice for Application No. 10174932.3 dated Jul. 30, 2013.

Lal D et al: "A novel MAC layer protocol for space division multiple access in wireless ad hoc networks", Computer Communications and Networks, 2002 Proceedings, Eleventh International Conference on Oct. 14, 2002, pp. 614-619.

Technical Search Report issued by the Taiwan Patent Office for TW Application No. 098143050, dated Aug. 2, 2013.

* cited by examiner

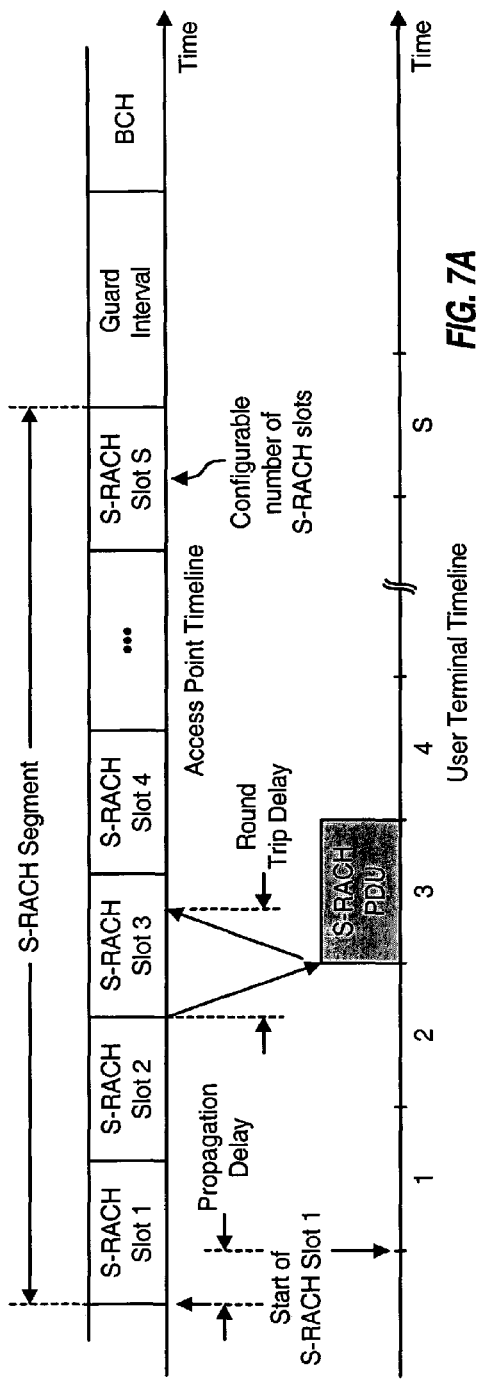
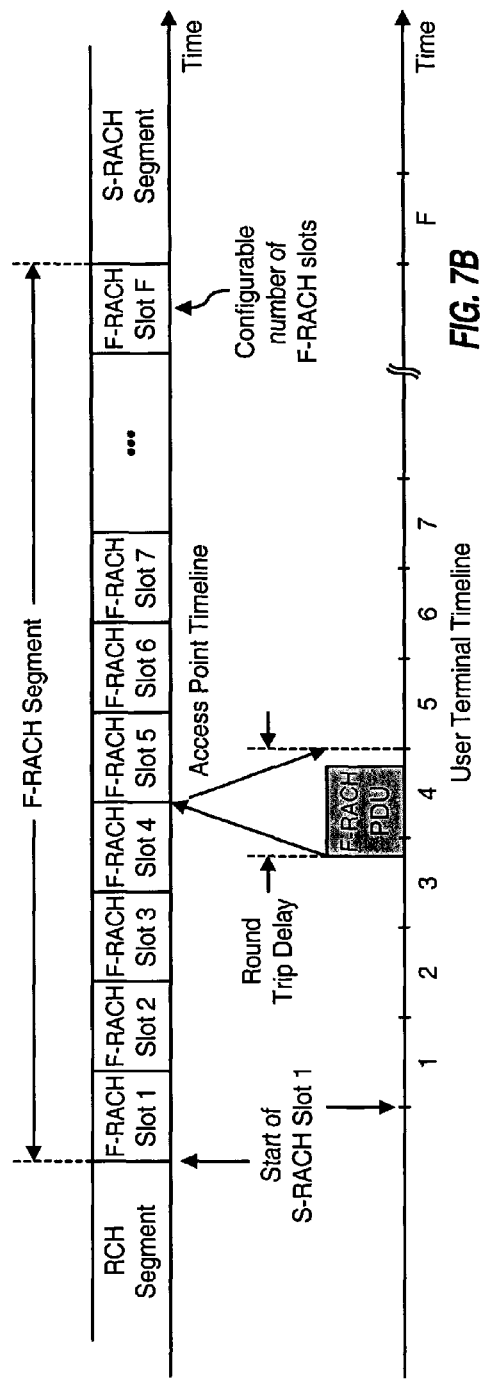
FIG. 7A
FIG. 7B

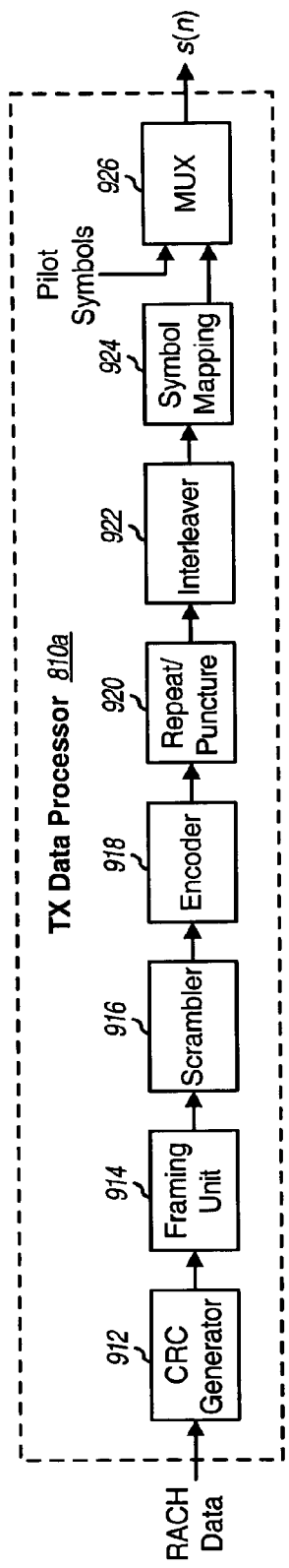
FIG. 9
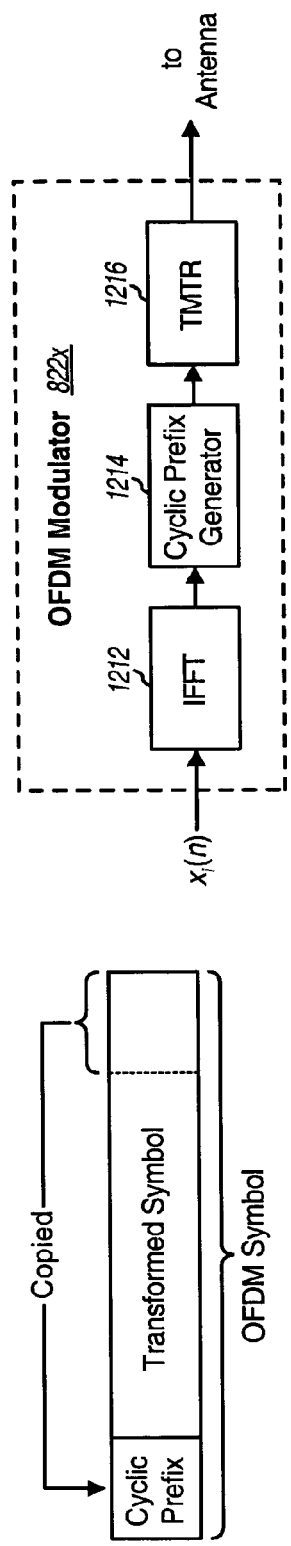
FIG. 12A
FIG. 12B

US 8,711,763 B2

RANDOM ACCESS FOR WIRELESS MULTIPLE-ACCESS COMMUNICATION SYSTEMS

PRIORITY CLAIMS & CROSS REFERENCE TO RELATED APPLICATIONS

This application is a continuation of U.S. Utility application Ser. No. 10/693,532, entitled RANDOM ACCESS FOR WIRELESS MULTIPLE ACCESS COMMUNICATION SYSTEMS, filed Oct. 23, 2003, assigned to the assignee of the present application, and incorporated herein by reference in its entirety for all purposes, which claimed the benefit of two U.S. provisional applications: (a) U.S. Provisional Application Ser. No. 60/421,309, entitled "MIMO WLAN System," filed on Oct. 25, 2002, assigned to the assignee of the present application, and incorporated herein by reference in its entirety for all purposes; and (b) U.S. Provisional Application Ser. No. 60/432,440, entitled "Random Access For Wireless Multiple-Access Communication Systems," filed on Dec. 10, 2002, assigned to the assignee of the present application, and incorporated herein by reference in its entirety for all purposes.

This application is further related to U.S. Provisional Application Ser. No. 60/432,626, entitled "Data Detection and Demodulation for Wireless Communication Systems," filed on Dec. 10, 2002, assigned to the assignee of the present application, and incorporated herein by reference in its entirety for all purposes.

TECHNICAL FIELD

The present invention relates generally to data communication, and more specifically to techniques for facilitating random access in wireless multiple-access communication systems.

BACKGROUND

Wireless communication systems are widely deployed to provide various types of communication such as voice, packet data, and so on. These systems may be multiple-access systems capable of supporting communication with multiple user terminals by sharing the available system resources. Examples of such multiple-access systems include code division multiple access (CDMA) systems, time division multiple access (TDMA) systems, and frequency division multiple access (FDMA) systems.

In a multiple-access communication system, a number of user terminals may desire to gain access to the system at random times. These user terminals may or may not have registered with the system, may have timing that is skewed with respect to system timing, and may or may not know the propagation delays to their access points. Consequently, the transmissions from user terminals attempting to gain access to the system may occur at random times, and may or may not be properly time-aligned at a receiving access point. The access point would need to detect for these transmissions in order to identify the specific user terminals desiring to gain access to the system.

Various challenges are encountered in the design of a random access scheme for a wireless multiple-access system. For example, the random access scheme should allow user terminals to quickly gain access to the system with as few access attempts as possible. Moreover, the random access scheme should be efficient and consume as a little of the system resources as possible.

There is therefore a need in the art for an effective and efficient random access scheme for wireless multiple-access communication systems.

SUMMARY

Techniques are provided herein for facilitating random access in wireless multiple-access communication systems. In an aspect, a random access channel (RACH) is defined to comprise a "fast" random access channel (F-RACH) and a "slow" random access channel (S-RACH). The F-RACH and S-RACH are designed to efficiently support user terminals in different operating states and employ different designs. The F-RACH is efficient and can be used to quickly access the system, and the S-RACH is more robust and can support user terminals in various operating states and conditions. The F-RACH may be used by user terminals that have registered with the system and can compensate for their round trip delays (RTDs) by properly advancing their transmit timing. The S-RACH may be used by user terminals that may or may not have registered with the system, and may or may not be able to compensate for their RTDs. The user terminals may use the F-RACH or S-RACH, or both, to gain access to the system.

Various aspects and embodiments of the invention are described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein:

FIGS. 7A and 7B show exemplary transmissions on the S-RACH and F-RACH, respectively;

FIG. 9 shows a block diagram of a TX data processor at a terminal;

FIG. 12A shows a block diagram of an OFDM modulator; and

FIG. 12B illustrates an OFDM symbol.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Figure 1:
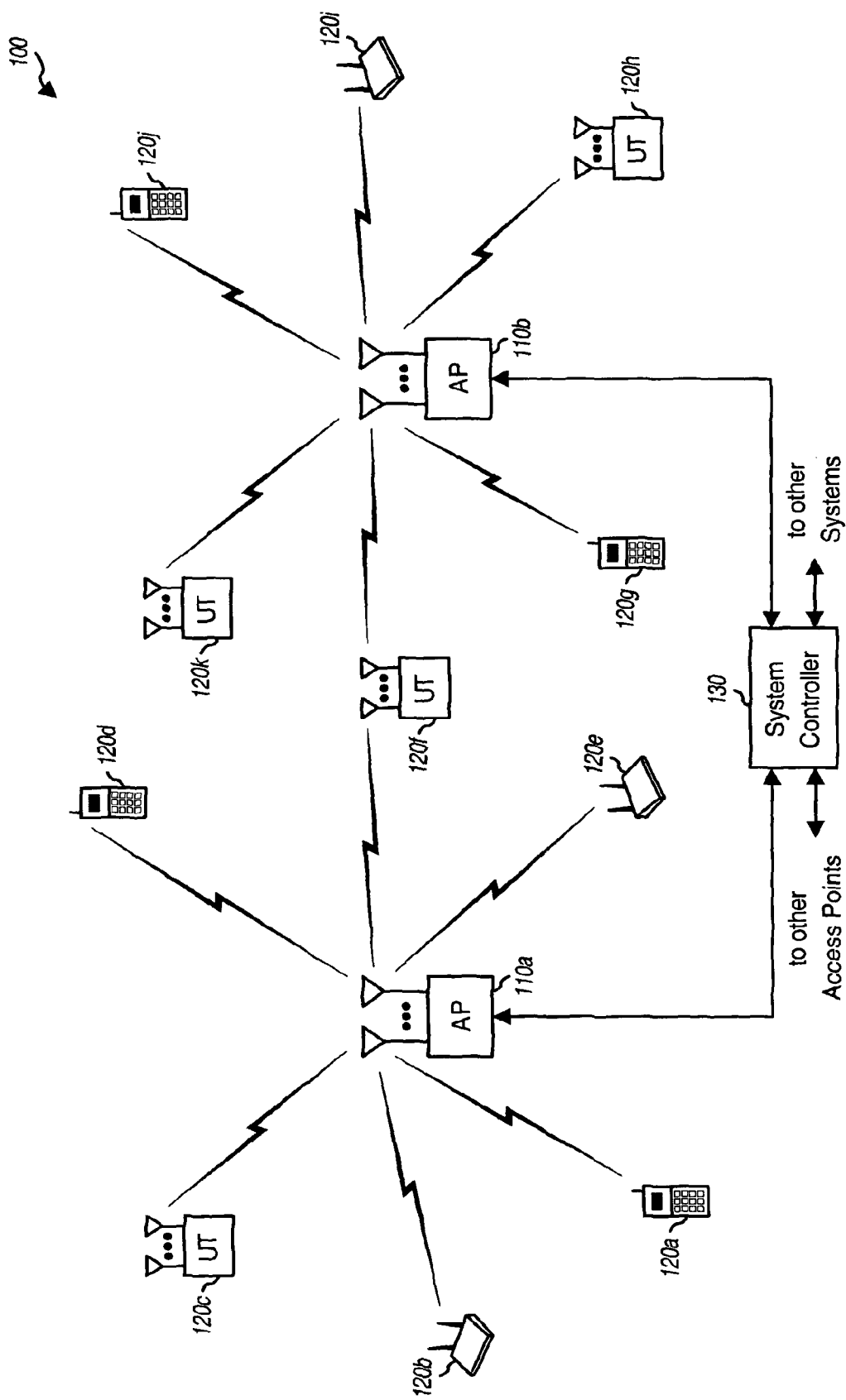
FIG. 1 shows a wireless multiple-access communication system.

FIG. 1 shows a wireless multiple-access communication system 100 that supports a number of users. System 100 includes a number of access points (APs) 110 that support communication for a number of user terminals (UTs) 120. For simplicity, only two access points 110a and 110b are shown in FIG. 1. An access point is generally a fixed station that is used for communicating with the user terminals. An access point may also be referred to as a base station or some other terminology.

User terminals 120 may be dispersed throughout the system. Each user terminal may be a fixed or mobile terminal that can communicate with the access point. A user terminal may also be referred to as an access terminal, a mobile station, a remote station, a user equipment (UE), a wireless device, or some other terminology. Each user terminal may communicate with one or possibly multiple access points on the downlink and/or the uplink at any given moment. The downlink (i.e., forward link) refers to transmission from the access point to the user terminal, and the uplink (i.e., reverse link) refers to transmission from the user terminal to the access point.

In FIG. 1, access point 110a communicates with user terminals 120a through 120f, and access point 110b communicates with user terminals 120f through 120k. A system controller 130 couples to access points 110 and may be designed to perform a number of functions such as (1) coordination and control for the access points coupled to it, (2) routing of data among these access points, and (3) control of access and communication with the user terminals served by these access points.

The random access techniques described herein may be used for various wireless multiple-access communication systems. For example, these techniques may be used for systems that employ (1) one or multiple antennas for data transmission and one or multiple antennas for data reception, (2) various modulation techniques (e.g., CDMA, OFDM, and so on), and (3) one or multiple frequency bands for the downlink and uplink.

For clarity, the random access techniques are specifically described below for an exemplary wireless multiple-access system. In this system, each access point is equipped with multiple (e.g., four) antennas for data transmission and reception, and each user terminal may be equipped with one or multiple antennas.

The system further employs orthogonal frequency division multiplexing (OFDM), which effectively partitions the overall system bandwidth into a number of (NF) orthogonal subbands. In one specific design, the system bandwidth is 20 MHz, $N_F=64$, the subbands are assigned indices of −32 to +31, the duration of each transformed symbol is 3.2 μsec, the cyclic prefix is 800 nsec, and the duration of each OFDM symbol is 4.0 μsec. An OFDM symbol period, which is also referred to as a symbol period, corresponds to the duration of one OFDM symbol.

The system also uses a single frequency band for both the downlink and uplink, which share this common band using time-division duplexing (TDD). Moreover, the system employs a number of transport channels to facilitate data transmission on the downlink and uplink.

Figure 2:
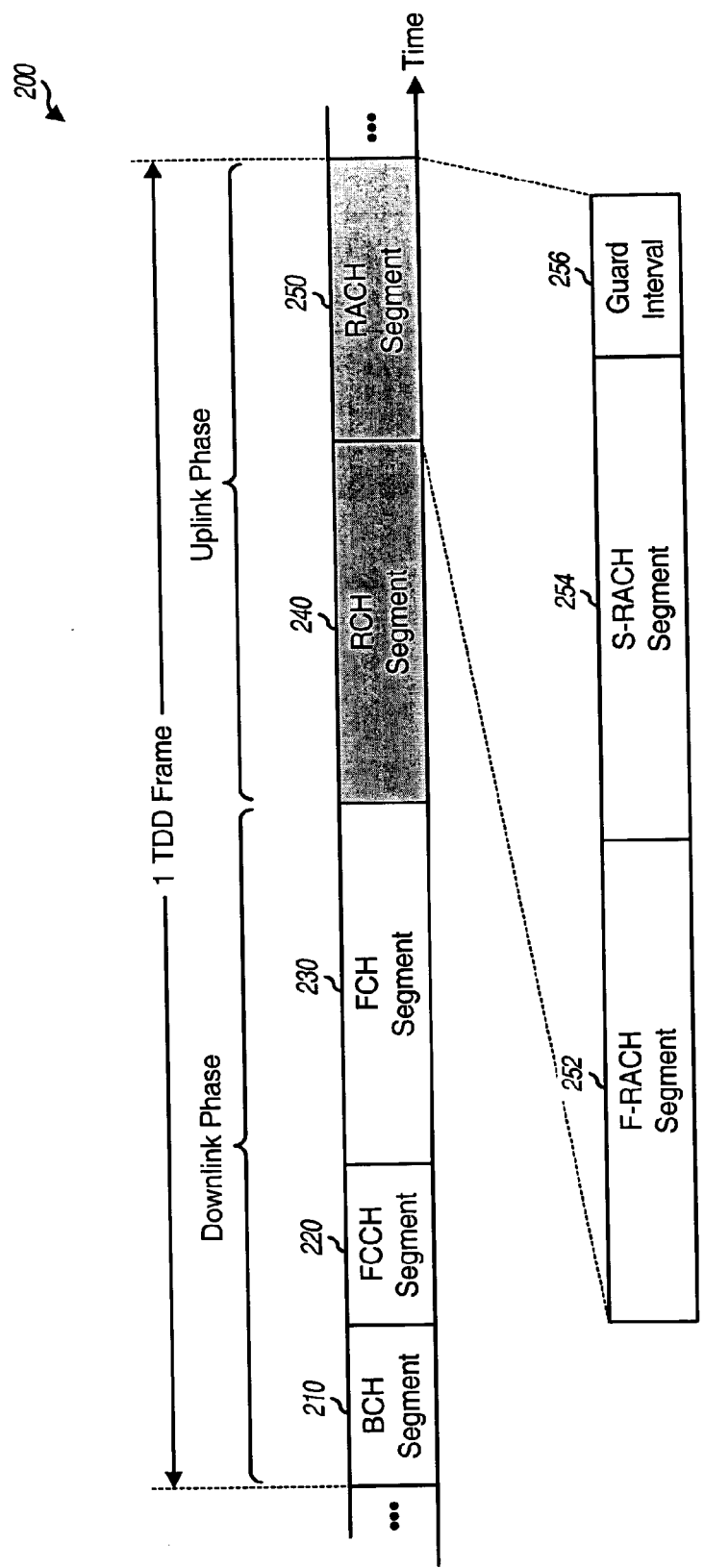
FIG. 2 shows a time division duplexed (TDD) frame structure.

FIG. 2 shows a frame structure 200 that may be used for a wireless TDD multiple-access system. Transmissions occur in units of TDD frames, each of which covers a particular time duration (e.g., 2 msec). Each TDD frame is partitioned into a downlink phase and an uplink phase. Each of the downlink and uplink phases is further partitioned into multiple segments for multiple downlink/uplink transport channels.

In the embodiment shown in FIG. 2, the downlink transport channels include a broadcast channel (BCH), a forward control channel (FCCH), and a forward channel (FCH), which are transmitted in segments 210, 220, and 230, respectively. The BCH is used to send (1) a beacon pilot that may be used for system timing and frequency acquisition, (2) a MIMO pilot that may be used for channel estimation, and (3) a BCH message that carries system information. The FCCH is used to send acknowledgments for the RACH and assignments of downlink and uplink resources. The FCH is used to send user-specific data packets, page and broadcast messages, and so on, on the downlink to the user terminals.

In the embodiment shown in FIG. 2, the uplink transport channels include a reverse channel (RCH) and a random access channel (RACH), which are transmitted in segments 240 and 250, respectively. The RCH is used to send data packets on the uplink. The RACH is used by the user terminals to gain access to the system.

The frame structure and transport channels shown in FIG. 2 are described in further detail in the aforementioned provisional U.S. Patent Application Ser. No. 60/421,309.

1. RACH Structure

In an aspect, the RACH is comprised of a "fast" random access channel (F-RACH) and a "slow" random access channel (S-RACH). The F-RACH and S-RACH are designed to efficiently support user terminals in different operating states and employ different designs. The F-RACH may be used by user terminals that have registered with the system and can compensate for their round trip delays (RTDs) by properly advancing their transmit timing, as described below. The S-RACH may be used by user terminals that have acquired the system frequency (e.g., via the beacon pilot sent on the BCH) but may or may not have registered with the system. When transmitting on the S-RACH, the user terminals may or may not be compensating for their RTDs.

Table 1 summarizes the requirements and characteristics of the F-RACH and S-RACH.

TABLE 1

| RACH Type | Description |
| --- | --- |
| F-RACH | Use for system access by user terminals that (1) have registered with the system, (2) can compensate for their round trip delay, and (3) can achieve the required received signal-to-noise ratio (SNR). A slotted Aloha random access scheme is used for the F-RACH. |
| S-RACH | Use for system access by user terminals that cannot use the F-RACH, e.g., because of failure to meet any of the requirements for using the F-RACH. An Aloha random access scheme is used for the S-RACH. |

Different designs are used for the F-RACH and S-RACH to facilitate rapid access to the system whenever possible and to minimize the amount of system resources needed to implement random access. In an embodiment, the F-RACH uses a shorter protocol data unit (PDU), employs a weaker coding scheme, and requires F-RACH PDUs to arrive approximately time-aligned at the access point. In an embodiment, the S-RACH uses a longer PDU, employs a stronger coding scheme, and does not require S-RACH PDUs to arrive time-aligned at the access point. The designs of the F-RACH and S-RACH and their use are described in detail below.

In a typical wireless communication system, each user terminal aligns its timing to that of the system. This is normally achieved by receiving from an access point a transmission (e.g., the beacon pilot sent on the BCH) that carries or is embedded with timing information. The user terminal then sets its timing based on the received timing information. However, the user terminal timing is skewed (or delayed) with respect to the system timing, where the amount of skew typically corresponds to the propagation delay for the transmission that contains the timing information. If the user terminal thereafter transmits using its timing, then the received transmission at the access point is effectively delayed by twice the propagation delay (i.e., the round trip delay), where one propagation delay is for the difference or skew between the user terminal timing and the system timing and the other propagation delay for the transmission from the user terminal to the access point (see FIG. 7A). For a transmission to arrive at a specific time instant based on the access point timing, the user terminal would need to adjust its transmit timing to compensate for the round trip delay to the access point (see FIG. 7B).

As used herein, an RTD compensated transmission refers to a transmission that has been sent in a manner such that it arrives at a receiver at a designated time instant based on the receiver timing. (There can be some errors, so the transmission may be received close to, and not necessarily exactly at, the designated time instant). If the user terminal is able to align its timing to that of the system (e.g., the timing for both is obtained based on GPS time), then an RTD compensated transmission would only need to account for the propagation delay from the user terminal to the access point.

FIG. 2 also shows an embodiment of a structure for the RACH. In this embodiment, RACH segment 250 is partitioned into three segments: a segment 252 for the F-RACH, a segment 254 for the S-RACH, and a guard segment 256. The F-RACH segment is first in the RACH segment because transmissions on the F-RACH are RTD compensated and would therefore not interfere with transmissions in the preceding RCH segment. The S-RACH segment is next in the RACH segment because transmissions on the S-RACH may not be RTD compensated and may interfere with those in the preceding RCH segment if placed first. The guard segment follows the S-RACH segment and is used to prevent S-RACH transmissions from interfering with the downlink transmission for the BCH in the next TDD frame.

In an embodiment, the configuration of both the F-RACH and S-RACH can be dynamically defined by the system for each TDD frame. For example, the starting location of the RACH segment, the duration of the F-RACH segment, the duration of the S-RACH segment, and the guard interval may be individually defined for each TDD frame. The duration of the F-RACH and S-RACH segments may be selected based on various factors such as, for example, the number of registered/unregistered user terminals, system loading, and so on. The parameters conveying the F-RACH and S-RACH configuration for each TDD frame may be sent to the user terminals via the BCH message that is transmitted in the same TDD frame.

Figure 3:
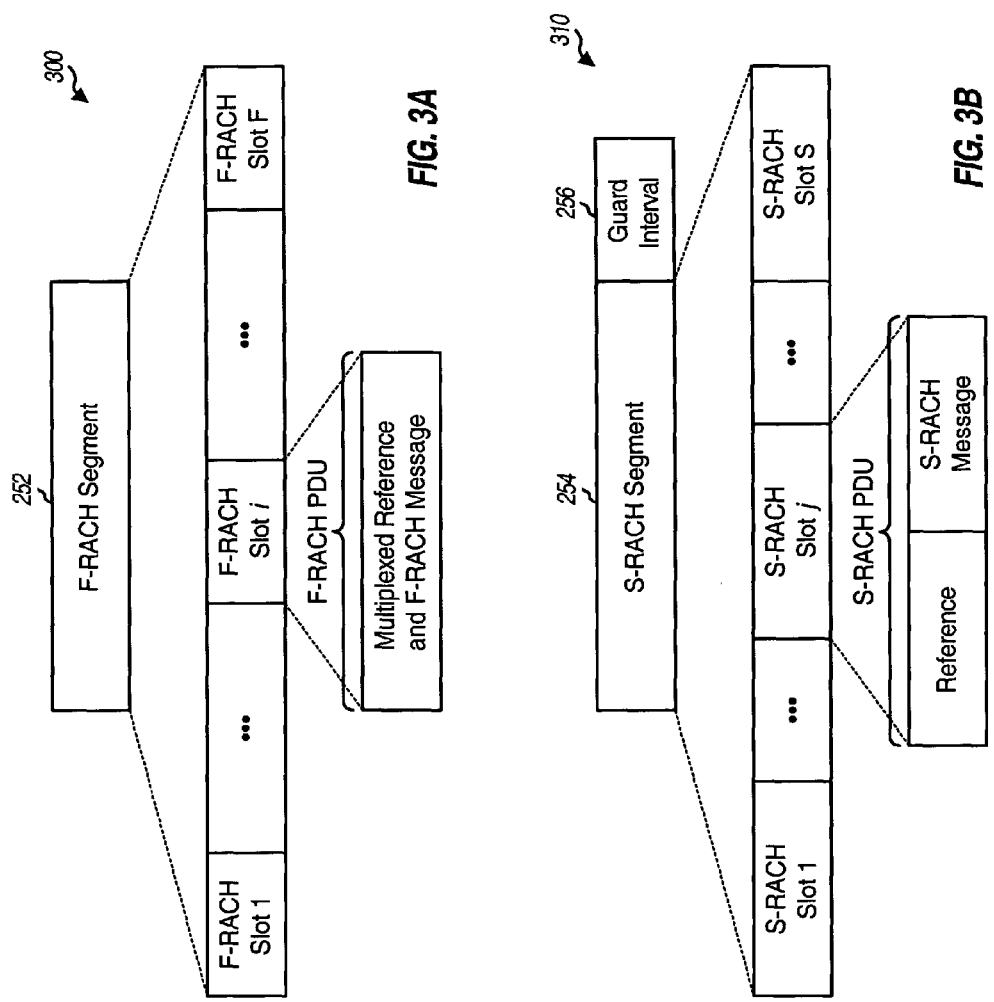
FIGS. 3A and 3B show slot structures for the F-RACH and S-RACH, respectively.

FIG. 3A shows an embodiment of a slot structure 300 that may be used for the F-RACH. The F-RACH segment is partitioned into a number of F-RACH slots. The specific number of F-RACH slots available in each TDD frame is a configurable parameter that is conveyed in the BCH message sent in the same TDD frame. In an embodiment, each F-RACH slot has a fixed duration that is defined to be equal to, for example, one OFDM symbol period.

In an embodiment, one F-RACH PDU may be sent in each F-RACH slot. The F-RACH PDU comprises a reference portion that is multiplexed with an F-RACH message. The F-RACH reference portion includes a set of pilot symbols that is transmitted on one set of subbands, and the F-RACH message comprises a group of data symbols that is transmitted on another set of subbands. The pilot symbols may be used for channel estimation and data demodulation. The subband multiplexing, processing for the F-RACH PDU, and operation of the F-RACH for system access are described in further detail below.

Table 2 lists the fields for an exemplary F-RACH message format.

TABLE 2

F-RACH Message

| Fields Names | Length (bits) | Description |
| --- | --- | --- |
| MAC ID | 10 | Temporary ID assigned to user terminal |
| Tail Bits | 6 | Tail bits for convolutional encoder |

The medium access control (MAC) ID field contains the MAC ID that identifies the specific user terminal sending the F-RACH message. Each user terminal registers with the system at the start of a communication session and is assigned a unique MAC ID. This MAC ID is thereafter used to identify the user terminal during the session. The Tail Bits field includes a group of zeros used to reset a convolutional encoder to a known state at the end of the F-RACH message.

FIG. 3B shows an embodiment of a slot structure 310 that may be used for the S-RACH. The S-RACH segment is also partitioned into a number of S-RACH slots. The specific number of S-RACH slots available for use in each TDD frame is a configurable parameter that is conveyed in the BCH message transmitted in the same TDD frame. In an embodiment, each S-RACH slot has a fixed duration that is defined to be equal to, for example, four OFDM symbol periods.

In an embodiment, one S-RACH PDU may be sent in each S-RACH slot. The S-RACH PDU comprises a reference portion followed by an S-RACH message. In a specific embodiment, the reference portion includes two pilot OFDM symbols that are used to facilitate acquisition and detection of the S-RACH transmission as well as to aid in coherent demodulation of the S-RACH message portion. The pilot OFDM symbols may be generated as described below.

Table 3 lists the fields for an exemplary S-RACH message format.

TABLE 3

S-RACH Message

| Fields Names | Length (bits) | Description |
| --- | --- | --- |
| MAC ID | 10 | Temporary ID assigned to user terminal |
| CRC | 8 | CRC value for the S-RACH message |
| Tail Bits | 6 | Tail bits for convolutional encoder |

For the embodiment shown in Table 3, the S-RACH message includes three fields. The MAC ID and Tail Bits fields are described above. The S-RACH may be used by unregistered user terminals for system access. For the first system access by an unregistered user terminal, a unique MAC ID has not yet been assigned to the user terminal. In this case, a registration MAC ID that is reserved for registration purpose may be used by the unregistered user terminal until a unique MAC ID is assigned. The registration MAC ID is a specific value (e.g., 0x0001). The cyclic redundancy check (CRC) field contains a CRC value for the S-RACH message. This CRC value may be used by the access point to determine whether the received S-RACH message is decoded correctly or in error. The CRC value is thus used to minimize the likelihood of incorrectly detecting the S-RACH message.

Tables 2 and 3 show specific embodiments of the formats for the F-RACH and S-RACH messages. Other formats with fewer, additional, and/or different fields may also be defined for these messages, and this is within the scope of the invention. For example, the S-RACH message may be defined to include a Slot ID field that carries the index of the specific S-RACH slot in which the S-RACH PDU was sent. As another example, the F-RACH message may be defined to include a CRC field.

FIGS. 3A and 3B show specific structures for the F-RACH and S-RACH. Other structures may also be defined for the F-RACH and S-RACH, and this is within the scope of the invention. For example, the F-RACH and/or S-RACH may be defined to have configurable slot duration, which may be conveyed in the BCH message.

FIGS. 3A and 3B also show specific embodiments of the F-RACH and S-RACH PDUs. Other PDU formats may also be defined, and this is also within the scope of the invention. For example, subband multiplexing may also be used for the S-RACH PDU. Moreover, the portions of each PDU may be defined with sizes that are different from those described above. For example, the reference portion of the S-RACH PDU may be defined to include only one pilot OFDM symbol.

The use of the F-RACH and S-RACH for random access can provide various benefits. First, improved efficiency is achieved by segregating user terminals into two groups. User terminals that can meet timing and received SNR requirements can use the more efficient F-RACH for random access, and all other user terminals can be supported by the S-RACH. The F-RACH can be operated as a slotted Aloha channel, which is known to be approximately two times more efficient than an unslotted Aloha channel. User terminals that cannot compensate for their RTDs would be restricted to the S-RACH and would not interfere with user terminals on the F-RACH.

Second, different detection thresholds may be used for the F-RACH and S-RACH. This flexibility allows the system to achieve different goals. For example, the detection threshold for the F-RACH may be set higher than the detection threshold for the S-RACH. This would then allow the system to favor user terminals that are more efficient (i.e., with higher received SNRs) to access the system via the F-RACH, which may provide higher overall system throughput. The detection threshold for the S-RACH may be set lower to allow all user terminals (with a particular minimum received SNR) to access the system.

Third, different designs and PDUs may be used for the F-RACH and S-RACH. For the specific embodiments described above, the F-RACH PDU comprises one OFDM symbol and the S-RACH PDU comprises four OFDM symbols. The different PDU sizes are due to different data being sent by the users of the F-RACH and users of the S-RACH and also due to different coding schemes and required received SNRs for the F-RACH and S-RACH. Overall, the F-RACH would then be approximately eight times more efficient than the S-RACH, where a factor of four comes from the shorter PDU size and a factor of two comes from the slotted nature of the F-RACH. Thus, for the same segment duration, the F-RACH can support eight times the number of user terminals that the S-RACH can support. Viewed another way, the same number of user terminals can be supported by an F-RACH segment that is ⅛ the duration of the S-RACH segment.

2. Random Access Procedures

The user terminals may use the F-RACH or S-RACH, or both, to gain access to the system. Initially, user terminals that have not registered with the system (i.e., those that have not been assigned unique MAC IDs) use the S-RACH to access the system. Once registered, the user terminals may use the F-RACH and/or S-RACH for system access.

Because different designs are used for the F-RACH and S-RACH, successful detection of a transmission on the F-RACH requires a higher received SNR than that required for a transmission on the S-RACH. For this reason, a user terminal that cannot transmit at a sufficient power level to achieve the required received SNR for the F-RACH can default to using the S-RACH. Moreover, if a user terminal fails to access the system after a specified number of consecutive attempts on the F-RACH, then it can also default to using the S-RACH.

Figure 4:
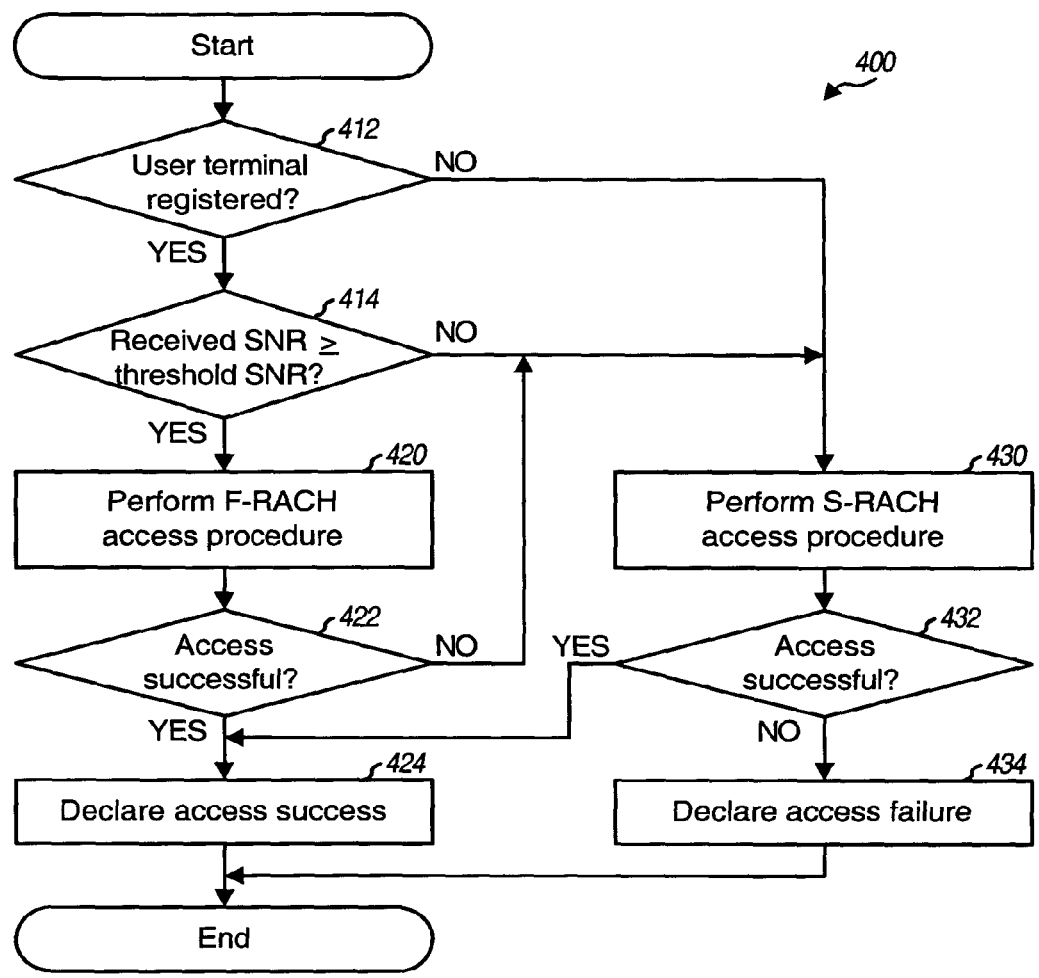
FIG. 4 shows an overall process for accessing the system using the F-RACH and/or S-RACH.

FIG. 4 shows a flow diagram of an embodiment of a process 400 performed by a user terminal for accessing the system using the F-RACH and/or S-RACH. Initially, a determination is made whether or not the user terminal has registered with the system (step 412). If the answer is no, then the S-RACH is used for system access and the process proceeds to step 430. Otherwise, a determination is next made whether or not the received SNR achieved for the user terminal is greater than or equal to the required received SNR for the F-RACH (i.e., the F-RACH threshold SNR) (step 414). Step 414 may be skipped if the received SNR for the user terminal is not known. If the answer for step 414 is no, then the process also proceeds to step 430.

If the user terminal is registered and the F-RACH threshold SNR is met, then an F-RACH access procedure is performed to attempt to access the system (step 420). After completion of the F-RACH access procedure (an embodiment of which is described below in FIG. 5), a determination is made whether or not access was successful (step 422). If the answer is yes, then access success is declared (step 424) and the process terminates. Otherwise, the process proceeds to step 430 to attempt access via the S-RACH.

If the terminal is not registered, cannot achieve the F-RACH threshold SNR, or was unsuccessful in gaining access via the F-RACH, then it performs an S-RACH access procedure to attempt to access the system (step 430). After completion of the S-RACH access procedure (an embodiment of which is described below in FIG. 6), a determination is made whether or not access was successful (step 432). If the answer is yes, then access success is declared (step 424). Otherwise, access failure is declared (step 434). In either case, the process then terminates.

For simplicity, the embodiment shown in FIG. 4 assumes that the user terminal has up-to-date RTD information if it is registered with the system. This assumption is generally true if the user terminal is stationary (i.e., at a fixed location) or if the wireless channel has not changed appreciably. For a mobile user terminal, the RTD may change noticeably between system accesses, or maybe even from access attempt to access attempt. Thus, process 400 may be modified to include a step to determine whether or not the user terminal has up-to-date RTD information. This determination may be made based on, for example, the elapsed time since the last system access, the observed channel behavior during the last system access, and so on.

In general, multiple types of random access channels are available, and one random access channel is selected for use initially based on the operating state of the user terminal. The operating state may be defined, for example, by the registration status of the user terminal, the received SNR, current RTD information, and so on. The user terminal may use multiple random access channels, one channel at a time, for system access.

A. F-RACH Procedure

In an embodiment, the F-RACH uses a slotted Aloha random access scheme whereby user terminals transmit in randomly selected F-RACH slots to attempt to gain access to the system. The user terminals are assumed to have current RTD information when transmitting on the F-RACH. As a result, the F-RACH PDUs are assumed to be time-aligned to F-RACH slot boundaries at the access point. This can greatly simplify the detection process and shorten the access time for user terminals that can meet the requirements for using the F-RACH.

A user terminal may send multiple transmissions on the F-RACH until access is gained or the maximum permitted number of access attempts has been exceeded. Various parameters may be changed for each F-RACH transmission to improve the likelihood of success, as described below.

Figure 5:
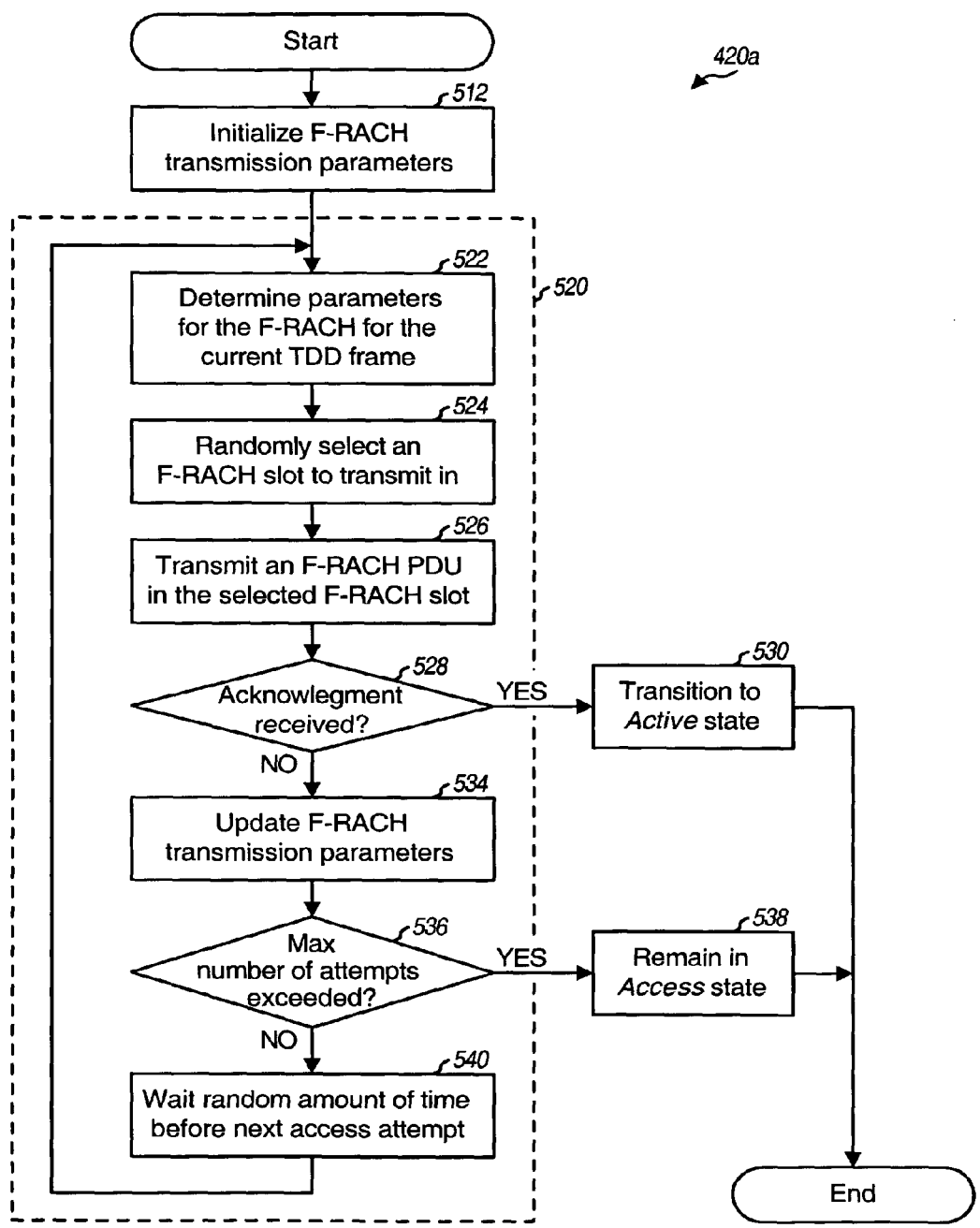
FIGS. 5 and 6 show processes for accessing the system using the F-RACH and S-RACH, respectively.

FIG. 5 shows a flow diagram of an embodiment of a process 420a performed by the user terminal for accessing the system using the F-RACH. Process 420a is an embodiment of the F-RACH access procedure performed in step 420 in FIG. 4.

Prior to the first transmission on the F-RACH, the user terminal initializes various parameters used for transmissions on the F-RACH (step 512). Such parameters may include, for example, the number of access attempts, the initial transmit power, and so on. A counter may be maintained to count the number of access attempts, and this counter may be initialized to one for the first access attempt. The initial transmit power is set such that the required received SNR for the F-RACH can be expected to be achieved at the access point. The initial transmit power may be estimated based on the received signal strength or SNR for the access point, as measured at the user terminal. The process then enters a loop 520.

For each transmission on the F-RACH, the user terminal processes the BCH to obtain pertinent system parameters for the current TDD frame (step 522). As described above, the number of F-RACH slots available in each TDD frame and the start of the F-RACH segment are configurable parameters that can change from frame to frame. The F-RACH parameters for the current TDD frame are obtained from the BCH message that is sent in the same frame. The user terminal then randomly selects one of the available F-RACH slots to transmit an F-RACH PDU to the access point (step 524). The user terminal then transmits the F-RACH PDU with compensation for the RTD such that the PDU arrives approximately time-aligned to the start of the selected F-RACH slot at the access point (step 526).

The access point receives and processes the F-RACH PDU, recovers the encapsulated F-RACH message, and determines the MAC ID included in the recovered message. For the embodiment shown in Table 2, the F-RACH message does not include a CRC value, so the access point is not able to determine whether the message was decoded correctly or in error. However, since only registered user terminals use the F-RACH for system access and since each registered user terminal is assigned a unique MAC ID, the access point can check the received MAC ID against the assigned MAC IDs. If the received MAC ID is one of the assigned MAC IDs, then the access point acknowledges receipt of the received F-RACH PDU. This acknowledgment may be sent in various manners, as described below.

After transmitting the F-RACH PDU, the user terminal determines whether or not an acknowledgment has been received for the transmitted PDU (step 528). If the answer is yes, then the user terminal transitions to an Active state (step 530), and the process terminates. Otherwise, if an acknowledgement is not received for the transmitted F-RACH PDU within a specified number of TDD frames, then the user terminal assumes that the access point did not receive the F-RACH PDU and resumes the access procedure on the F-RACH.

For each subsequent access attempt, the user terminal first updates the F-RACH transmission parameters (step 534). The updating may entail (1) incrementing the counter by one for each subsequent access attempt and (2) adjusting the transmit power (e.g., increasing it by a particular amount). A determination is then made whether or not the maximum permitted number of access attempts on the F-RACH has been exceeded based on the updated counter value (step 536). If the answer is yes, then the user terminal remains in an Access state (step 538), and the process terminates.

If the maximum permitted number of access attempts has not been exceeded, then the user terminal determines the amount of time to wait before transmitting the F-RACH PDU for the next access attempt. To determine this wait time, the user terminal first determines the maximum amount of time to wait for the next access attempt, which is also referred to as the contention window (CW). In an embodiment, the contention window (which is given in units of TDD frames) exponentially increases for each access attempt (i.e., $CW=2^{access\_attempt}$). The contention window may also be determined based on some other function (e.g., a linear function) of the number of access attempts. The amount of time to wait for the next access attempt is then randomly selected between zero and CW. The user terminal would wait this amount of time before transmitting the F-RACH PDU for the next access attempt (step 540).

After waiting the randomly selected wait time, the user terminal again determines the F-RACH parameters for the current TDD frame by processing the BCH message (step 522), randomly selects an F-RACH slot for transmission (step 524), and transmits the F-RACH PDU in the randomly selected F-RACH slot (step 526).

The F-RACH access procedure continues until either (1) the user terminal receives an acknowledgment from the access point or (2) the maximum number of permitted access attempts has been exceeded. For each subsequent access attempt, the amount of time to wait before transmitting the F-RACH PDU, the specific F-RACH slot to use for the F-RACH transmission, and the transmit power for the F-RACH PDU may be selected as described above.

B. S-RACH Procedure

In an embodiment, the S-RACH uses an Aloha random access scheme whereby user terminals transmit in randomly selected S-RACH slots to attempt to gain access to the system. Even though the user terminals attempt to transmit on specific S-RACH slots, the transmit timing for the transmissions on the S-RACH is not assumed to be RTD compensated. As a result, when the user terminals do not have good estimates of their RTDs, the behavior of the S-RACH is similar to that of an unslotted Aloha channel.

Figure 6:
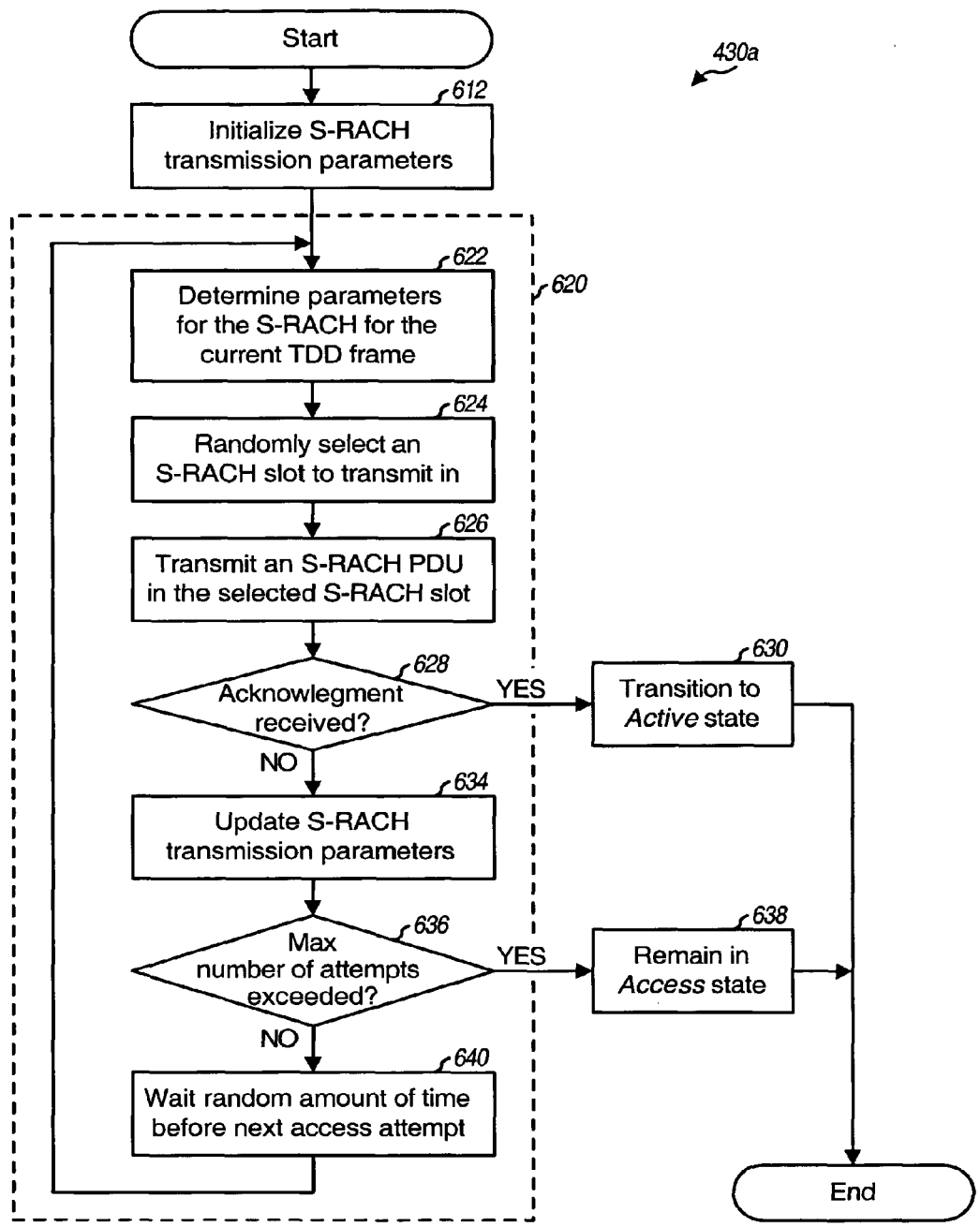

FIG. 6 shows a flow diagram of an embodiment of a process 430a performed by the user terminal for accessing the system using the S-RACH. Process 430a is an embodiment of the S-RACH access procedure performed in step 430 in FIG. 4.

Prior to the first transmission on the S-RACH, the user terminal initializes various parameters used for transmissions on the S-RACH (e.g., the number of access attempts, the initial transmit power, and so on) (step 612). The process then enters a loop 620.

For each transmission on the S-RACH, the user terminal processes the BCH to obtain pertinent parameters for the S-RACH for the current TDD frame, such as the number of S-RACH slots available and the start of the S-RACH segment (step 622). The user terminal next randomly selects one of the available S-RACH slots to transmit an S-RACH PDU (step 624). The S-RACH PDU includes an S-RACH message having the fields shown in Table 3. The RACH message includes either the assigned MAC ID, if the user terminal is registered with the system, or the registration MAC ID, otherwise. The user terminal then transmits the S-RACH PDU to the access point in the selected S-RACH slot (step 626). If the user terminal knows the RTD, then it can adjust its transmit timing accordingly to account for the RTD.

The access point receives and processes the S-RACH PDU, recovers the S-RACH message, and checks the recovered message using the CRC value included in the message. The access point discards the S-RACH message if the CRC fails. If the CRC passes, then the access point obtains the MAC ID included in the recovered message and acknowledges receipt of the S-RACH PDU.

After transmitting the S-RACH PDU, the user terminal determines whether or not an acknowledgment has been received for the transmitted PDU (step 628). If the answer is yes, then the user terminal transitions to the Active state (step 630), and the process terminates. Otherwise, the user terminal assumes that the access point did not receive the S-RACH PDU and resumes the access procedure on the S-RACH.

For each subsequent access attempt, the user terminal first updates the S-RACH transmission parameters (e.g., increments the counter, adjusts the transmit power, and so on) (step 634). A determination is then made whether or not the maximum permitted number of access attempts on the S-RACH has been exceeded (step 636). If the answer is yes, then the user terminal would remain in the Access state (step 638), and the process terminates. Otherwise, the user terminal determines the amount of time to wait before transmitting the S-RACH PDU for the next access attempt. The wait time may be determined as described above for FIG. 5. The user terminal would wait this amount of time (step 640). After waiting the randomly selected wait time, the user terminal again determines the S-RACH parameters for the current TDD frame by processing the BCH message (step 622), randomly selects an S-RACH slot for transmission (step 624), and transmits the S-RACH PDU in the randomly selected S-RACH slot (step 626).

The S-RACH access procedure described above continues until either (1) the user terminal receives an acknowledgment from the access point or (2) the maximum number of permitted access attempts has been exceeded.

C. RACH Acknowledgment

In an embodiment, to acknowledge a correctly received F/S-RACH PDU, the access point sets a F/S-RACH Acknowledgment bit in the BCH message and transmits a RACH acknowledgement on the FCCH. Separate F-RACH and S-RACH Acknowledgment bits may be used for the F-RACH and S-RACH, respectively. There may be a delay between the setting of the F/S-RACH Acknowledgment bit on the BCH and the sending of the RACH acknowledgment on the FCCH, which may be used to account for scheduling delay and so on. The F/S-RACH Acknowledgment bit prevents the user terminal from retrying and allows unsuccessful user terminals to retry quickly.

After the user terminal sends the F/S-RACH PDU, it monitors the BCH and FCCH to determine whether or not its PDU has been received by the access point. The user terminal monitors the BCH to determine whether or not the corresponding F/S-RACH Acknowledgment bit is set. If this bit is set, which indicates that an acknowledgment for this and/or some other user terminals may be sent on the FCCH, then the user terminal further processes the FCCH for the RACH acknowledgement. Otherwise, if this bit is not set, then the user terminal continues to monitor the BCH or resumes its access procedure.

The FCCH is used to carry acknowledgements for successful access attempts. Each RACH acknowledgement contains the MAC ID associated with the user terminal for which the acknowledgment is sent. A quick acknowledgement may be used to inform the user terminal that its access request has been received but is not associated with an assignment of FCH/RCH resources. An assignment-based acknowledgement is associated with an FCH/RCH assignment. If the user terminal receives a quick acknowledgement on the FCCH, it transitions to a Dormant state. If the user terminal receives an assignment-based acknowledgement, it obtains scheduling information sent along with the acknowledgment and begins using the FCH/RCH as assigned by the system.

If a user terminal is performing a registration, then it uses the registration MAC ID. For an unregistered user terminal, the RACH acknowledgment may direct the user terminal to initiate a registration procedure with the system. Via the registration procedure, the unique identity of the user terminal is ascertained based on, for example, an electronic serial number (ESN) that is unique for each user terminal in the system. The system would then assign a unique MAC ID to the user terminal (e.g., via a MAC ID Assignment Message sent on the FCH).

For the S-RACH, all unregistered user terminals use the same registration MAC ID to access the system. Thus, it is possible for multiple unregistered user terminals to coincidentally transmit in the same S-RACH slot. In this case, if the access point were able to detect a transmission on this S-RACH slot, then the system would (unknowingly) initiate the registration procedure simultaneously with multiple user terminals. Via the registration procedure (e.g., through the use of CRC and the unique ESNs for these user terminals), the system will be able to resolve the collision. As one possible outcome, the system may not be able to correctly receive the transmissions from any of these user terminals because they interfere with one another, in which case the user terminals can restart the access procedure. Alternatively, the system may be able to correctly receive the transmission from the strongest user terminal, in which case the weaker user terminal(s) can restart the access procedure.

D. RTD Determination

The transmission from an unregistered user terminal may not be compensated for RTD and may arrive at the access point not aligned to an S-RACH slot boundary. As part of the access/registration procedure, the RTD is determined and provided to the user terminal for use for subsequent uplink transmissions. The RTD may be determined in various manners, some which are described below.

In a first scheme, the S-RACH slot duration is defined to be greater than the longest expected RTD for all user terminals in the system. For this scheme, each transmitted S-RACH PDU will be received starting in the same S-RACH slot for which the transmission was intended. There would then be no ambiguity as to which S-RACH slot was used to transmit the S-RACH PDU.

In a second scheme, the RTD is determined piecemeal by the access and registration procedures. For this scheme, the S-RACH slot duration may be defined to be less than the longest expected RTD. A transmitted S-RACH PDU may then be received zero, one, or multiple S-RACH slots later than the intended S-RACH slot. The RTD may be partitioned into two parts: (1) a first part for an integer number of S-RACH slots (the first part may be equal to 0, 1, 2, or some other value) and (2) a second part for a fractional portion of an S-RACH slot. The access point can determine the fractional portion based on the received S-RACH PDU. During registration, the transmit timing of the user terminal can be adjusted to compensate for the fractional portion so that the transmission from the user terminal arrives aligned to an S-RACH slot boundary. The first part may then be determined during the registration procedure and reported to the user terminal.

In a third scheme, the S-RACH message is defined to include a Slot ID field. This field carries the index of the specific S-RACH slot in which the S-RACH PDU was transmitted. The access point would then be able to determine the RTD for the user terminal based on the slot index included in the Slot ID field.

The Slot ID field may be implemented in various manners. In a first implementation, the S-RACH message duration is increased (e.g., from 2 to 3 OFDM symbols) while maintaining the same code rate. In a second implementation, the S-RACH message duration is maintained but the code rate is increased (e.g., from rate 1/4 to rate 1/2), which would allow for more information bits. In a third implementation, the S-RACH PDU duration is maintained (e.g., at 4 OFDM symbols) but the S-RACH message portion is lengthened (e.g., from 2 to 3 OFDM symbols) and the reference portion is shortened (e.g., from 2 down to 1 OFDM symbol).

Shortening the reference portion of the S-RACH PDU decreases the received signal quality for the reference, which would then increase the likelihood of not detecting an S-RACH transmission (i.e., higher missed detection probability). In this case, the detection threshold (which is used to indicate whether or not an S-RACH transmission is present) may be decreased to achieve the desired missed detection probability. The lower detection threshold increases the likelihood of declaring a received S-RACH transmission when none is present (i.e., higher false alarm probability). However, the CRC value included in each S-RACH message may be used to achieve an acceptable probability of false detection.

In a fourth scheme, the slot index is embedded in the CRC value for the S-RACH message. The data for an S-RACH message (e.g., the MAC ID, for the embodiment shown in Table 3) and the slot index may be provided to a CRC generator and used to generate a CRC value. The MAC ID and CRC value (but not the slot index) are then transmitted in the S-RACH message. At the access point, the received S-RACH message (e.g., the received MAC ID) and an expected slot index are used to generate a CRC value for the received message. The generated CRC value is then compared against the CRC value in the received S-RACH message. If the CRC passes, then the access point declares success and proceeds to process the message. If the CRC fails, then the access point declares failure and ignores the message.

E. F-RACH and S-RACH Transmissions

FIG. 7A shows an exemplary transmission on the S-RACH. The user terminal selects a specific S-RACH slot (e.g., slot 3) for transmission of an S-RACH PDU. However, if the S-RACH transmission is not RTD compensated, then the transmitted S-RACH PDU would not arrive time-aligned to the start of the selected S-RACH slot based on the access point timing. The access point is able to determine the RTD as described above.

FIG. 7B shows an exemplary transmission on the F-RACH. The user terminal selects a specific F-RACH slot (e.g., slot 5) for transmission of an F-RACH PDU. The F-RACH transmission is RTD compensated, and the transmitted F-RACH PDU arrives approximately time-aligned to the start of the selected F-RACH slot at the access point.

3. System

For simplicity, in the following description, the term "RACH" may refer to the F-RACH or S-RACH, or the RACH, depending on the context in which the term is used.

Figure 8:
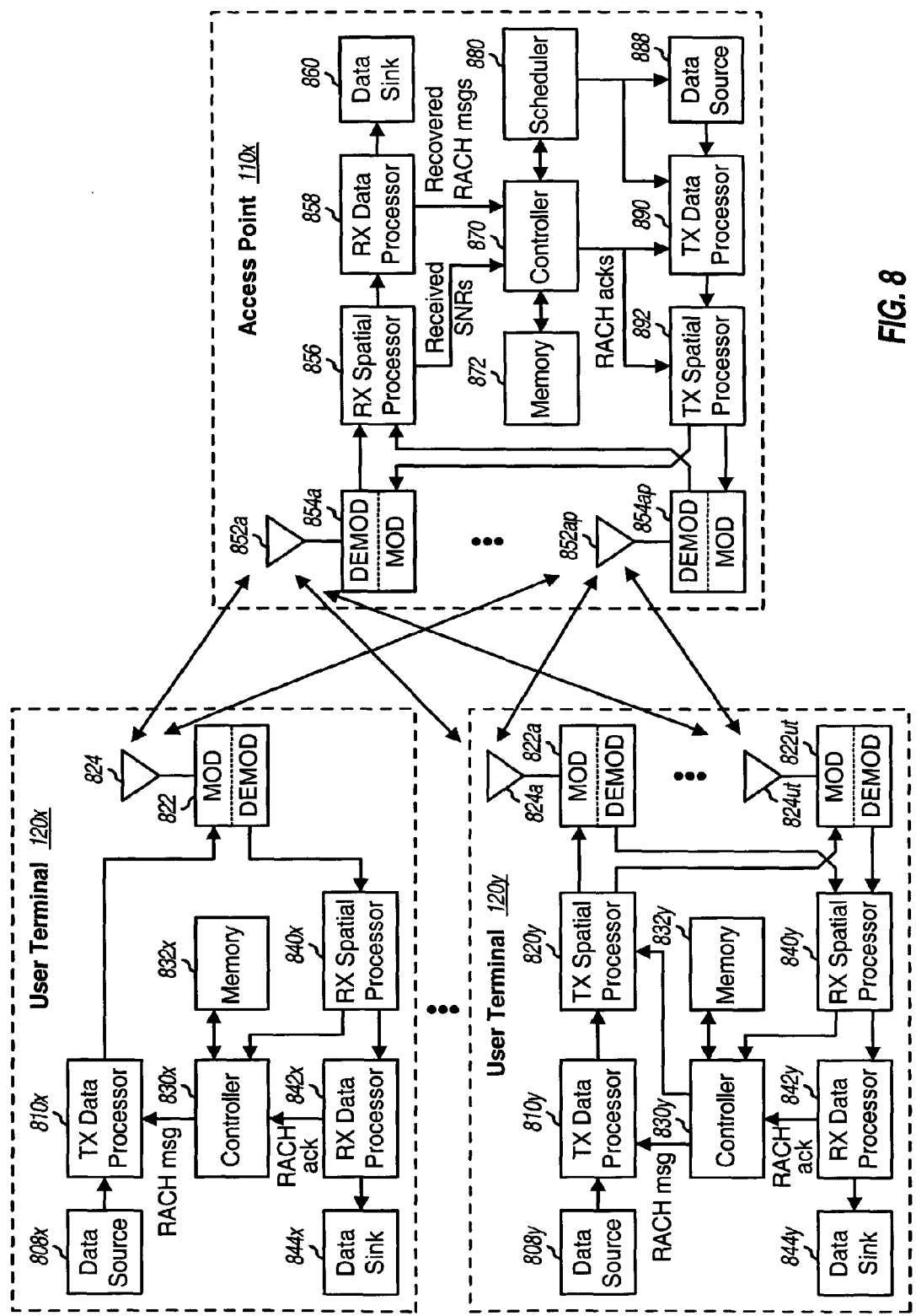
FIG. 8 shows an access point and two user terminals.

FIG. 8 shows a block diagram of an embodiment of an access point 110x and two user terminals 120x and 120y in system 100. User terminal 120x is equipped with a single antenna and user terminal 120y is equipped with $N_{ut}$ antennas. In general, the access point and user terminals may each be equipped with any number of transmit/receive antennas.

On the uplink, at each user terminal, a transmit (TX) data processor 810 receives traffic data from a data source 808 and signaling and other data (e.g., for RACH messages) from a controller 830. TX data processor 810 formats, codes, interleaves, and modulates the data to provide modulation symbols. If the user terminal is equipped with a single antenna, then these modulation symbols correspond to a stream of transmit symbols. If the user terminal is equipped with multiple antennas, then a TX spatial processor 820 receives and performs spatial processing on the modulation symbols to provide a stream of transmit symbols for each of the antennas. Each modulator (MOD) 822 receives and processes a respective transmit symbol stream to provide a corresponding uplink modulated signal, which is then transmitted from an associated antenna 824.

At access point 110x, $N_{ap}$ antennas 852a through 852ap receive the transmitted uplink modulated signals from the user terminals, and each antenna provides a received signal to a respective demodulator (DEMOD) 854. Each demodulator 854 performs processing complementary to that performed at modulator 822 and provides received symbols. A receive (RX) spatial processor 856 then performs spatial processing on the received symbols from all demodulators 854a through 854ap to provide recovered symbols, which are estimates of the modulation symbols transmitted by the user terminals. An RX data processor 858 further processes (e.g., symbol demaps, deinterleaves, and decodes) the recovered symbols to provide decoded data (e.g., for recovered RACH messages), which may be provided to a data sink 860 for storage and/or a controller 870 for further processing. RX spatial processor 856 may also estimate and provide the received SNR for each user terminal, which may be used to determine whether the F-RACH or S-RACH should be used for system access.

The processing for the downlink may be the same or different from the processing for the uplink. Data from a data source 888 and signaling (e.g., RACH acknowledgment) from controller 870 and/or scheduler 880 are processed (e.g., coded, interleaved, and modulated) by a TX data processor 890 and further spatially processed by a TX spatial processor 892. The transmit symbols from TX spatial processor 892 are further processed by modulators 854a through 854ap to generate $N_{ap}$ downlink modulated signals, which are then transmitted via antennas 852a through 852ap.

At each user terminal 120, the downlink modulated signals are received by antenna(s) 824, demodulated by demodulator(s) 822, and processed by an RX spatial processor 840 and an RX data processor 842 in a complementary manner to that performed at the access point. The decoded data for the downlink may be provided to a data sink 844 for storage and/or controller 830 for further processing.

Controllers 830 and 870 control the operation of various processing units at the user terminal and the access point, respectively. Memory units 832 and 872 store data and program codes used by controllers 830 and 870, respectively.

FIG. 9 shows a block diagram of an embodiment of a TX data processor 810a that can perform data processing for the F-RACH and S-RACH and which may be use for TX data processors 810*x* and 810*y* in FIG. 8.

Within TX data processor 810*a*, a CRC generator 912 receives the data for a RACH PDU. The RACH data includes just the MAC ID for the embodiments shown in Tables 2 and 3. CRC generator 912 generates a CRC value for the MAC ID if the S-RACH is used for system access. A framing unit 914 multiplexes the MAC ID and the CRC value (for an S-RACH PDU) to form the major portion of the RACH message, as shown in Tables 2 and 3. A scrambler 916 then scrambles the framed data to randomize the data.

An encoder 918 receives and multiplexes the scrambled data with tail bits, and further codes the multiplexed data and tail bits in accordance with a selected coding scheme to provide code bits. A repeat/puncture unit 920 then repeats or punctures (i.e., deletes) some of the code bits to obtain the desired code rate. An interleaver 922 next interleaves (i.e., reorders) the code bits based on a particular interleaving scheme. A symbol mapping unit 924 maps the interleaved data in accordance with a particular modulation scheme to provide modulation symbols. A multiplexer (MUX) 926 then receives and multiplexes the modulation symbols with pilot symbols to provide a stream of multiplexed symbols. Each of the units in TX data processor 810*a* is described in further detail below.

4. F-RACH and S-RACH Designs

As noted above, different designs are used for the F-RACH and S-RACH to facilitate rapid system access for registered user terminals and to minimize the amount of system resources needed to implement the RACH. Table 4 shows various parameters for exemplary designs of the F-RACH and S-RACH.

TABLE 4

| Parameter | F-RACH | S-RACH | Units |
|---|---|---|---|
| PDU Length | 1 | 4 | OFDM symbols |
| CRC | No | Yes | |
| Code Rate | 2/3 | 1/4 | |
| Modulation Scheme | BPSK | BPSK | |
| Spectral Efficiency | 0.67 | 0.25 | bps/Hz |

Figure 10A:
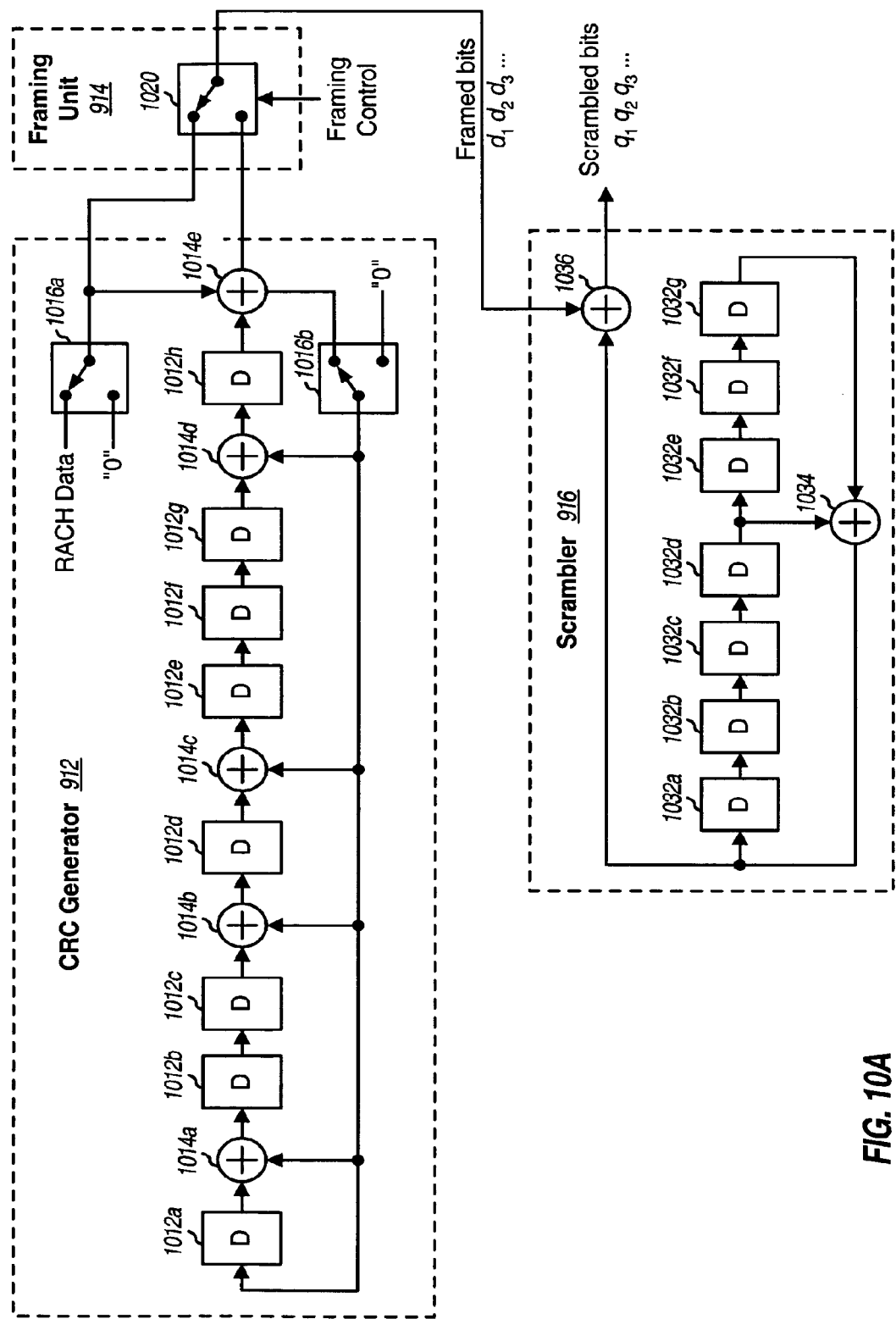
FIGS. 10A and 10B show block diagrams of the processing units within the TX data processor.

FIG. 10A shows a block diagram of an embodiment of CRC generator 912, which implements the following 8-bit generator polynomial:

$$g(x)=x^8+x^7+x^3+x+1 \quad \text{Eq (1)}$$

Other generator polynomials may also be used for the CRC, and this is within the scope of the invention.

CRC generator 912 includes eight delay elements (D) 1012*a* through 1012*h* and five adders 1014*a* through 1014*e* that are coupled in series and implement the generator polynomial shown in equation (1). A switch 1016*a* provides the RACH data (e.g., the MAC ID) to the generator for the computation of the CRC value and N zeros to the generator when the CRC value is being read out, where N is the number of bits for the CRC and is equal to 8 for the generator polynomial shown in equation (1). For the embodiment described above wherein an m-bit slot index is embedded in the CRC, switch 1016*a* may be operated to provide the m-bit slot index followed by N−m zeros (instead of N zeros) when the CRC value is being read out. A switch 1016*b* provides the feedback for the generator during the computation of the CRC value and zeros to the generator when the CRC value is being read out. Adder 1014*e* provides the CRC value after all of the RACH data bits have been provided to the generator. For the embodiment described above, switches 1016*a* and 1016*b* are initially in the UP position for 10 bits (for the MAC ID) and then in the DOWN position for 8 bits (for the CRC value).

FIG. 10A also shows an embodiment of framing unit 914, which comprises a switch 1020 that selects the RACH data (or MAC ID) first and then the optional CRC value (if an S-RACH PDU is to be transmitted).

FIG. 10A further shows an embodiment of scrambler 916, which implements the following generator polynomial:

$$G(x)=x^7+x^4+x. \quad \text{Eq (2)}$$

Scrambler 916 includes seven delay elements 1032*a* through 1032*g* coupled in series. For each clock cycle, an adder 1034 performs modulo-2 addition of the two bits stored in delay elements 1032*d* and 1032*g* and provides a scrambling bit to delay element 1032*a*. The framed bits ($d_1$ $d_2$ $d_3$ ... ) are provided to an adder 1036, which also receives scrambling bits from adder 1034. Adder 1036 performs modulo-2 addition of each framed bit $d_n$ with a corresponding scrambling bit to provide a scrambled bit $q_n$.

Figure 10B:
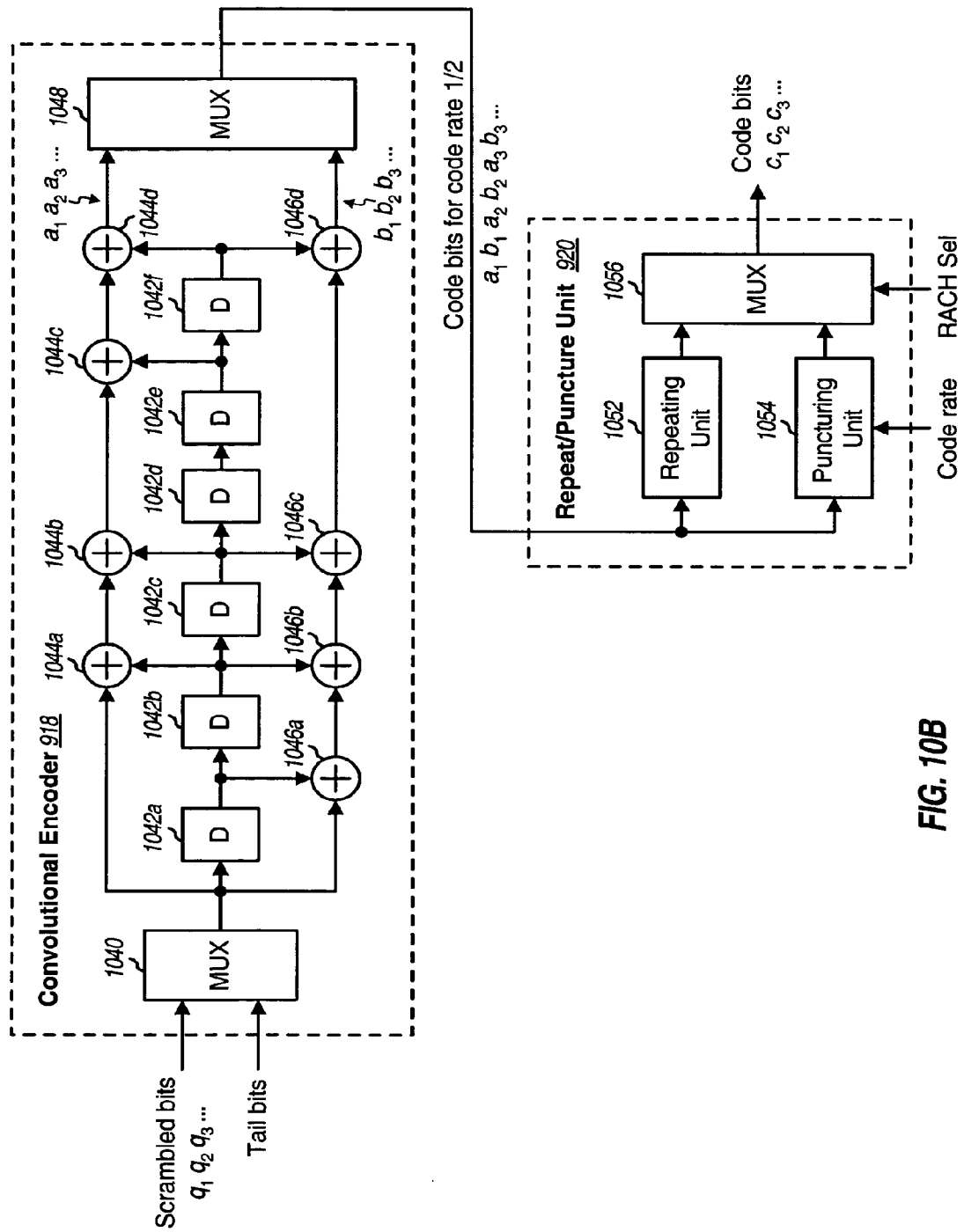

FIG. 10B shows a block diagram of an embodiment of encoder 918, which implements a rate 1/2, constraint length 7 (K=7), binary convolutional code with generators of 133 and 171 (octal). Within encoder 918, a multiplexer 1040 receives and multiplexes the scrambled data and the tail bits. Encoder 918 further includes six delay elements 1042*a* through 1042*f* coupled in series. Four adders 1044*a* through 1044*d* are also coupled in series and used to implement the first generator (133). Similarly, four adders 1046*a* through 1046*d* are coupled in series and used to implement the second generator (171). The adders are further coupled to the delay elements in a manner to implement the two generators of 133 and 171, as shown in FIG. 10B. A multiplexer 1048 receives and multiplexes the two streams of code bits from the two generators into a single stream of code bits. For each input bit $q_n$, two code bits $a_n$ and $b_n$ are generated, which results in a code rate of 1/2.

FIG. 10B also shows an embodiment of repeat/puncture unit 920 that can be used to generate other code rates based on the base code rate of 1/2. Within unit 920, the rate 1/2 code bits from encoder 918 are provided to a repeating unit 1052 and a puncturing unit 1054. Repeating unit 1052 repeats each rate 1/2 code bit once to obtain an effective code rate of 1/4. Puncturing unit 1054 deletes some of the rate 1/2 code bits based on a specific puncturing pattern to provide the desired code rate. In an embodiment, the rate 2/3 for the F-RACH is achieved based on a puncturing pattern of "1110", which denotes that every fourth rate 1/2 code bits is deleted to obtain an effective code rate of 2/3.

Referring back to FIG. 9, interleaver 922 reorders the code bits for each RACH PDU to obtain frequency diversity (for both the S-RACH and F-RACH) and time diversity (for the S-RACH). For the embodiment shown in Table 2, an F-RACH PDU includes 16 data bits that are coded using rate 2/3 code to generate 24 code bits, which are transmitted on 24 data subbands in one OFDM symbol using BPSK.

Table 5 shows the subband interleaving for the F-RACH. For each F-RACH PDU, interleaver 922 initially assigns chip indices of 0 through 23 to the 24 code bits for the F-RACH PDU. Each code bit is then mapped to a specific data subband based on its chip index, as shown in Table 5. For example, the code bit with chip index 0 is mapped to subband −24, the code bit with chip index 1 is mapped to subband −12, the code bit with chip index 2 is mapped to subband 2, and so on.

TABLE 5

Pilot Symbols and Data Subband Interleaving for F-RACH

| Sub-band Index | Pilot Symbol p(k) | Chip Index |
|---|---|---|
| −32 | 0 | |
| −31 | 0 | |
| −30 | 0 | |
| −29 | 0 | |
| −28 | 0 | |
| −27 | 0 | |
| −26 | −1 + j | |
| −25 | −1 + j | |
| −24 | | 0 |
| −23 | −1 − j | |
| −22 | | 12 |
| −21 | −1 − j | |
| −20 | | 4 |
| −19 | −1 − j | |
| −18 | | 16 |
| −17 | 1 + j | |
| −16 | | 8 |
| −15 | 1 + j | |
| −14 | | 20 |
| −13 | 1 + j | |
| −12 | | 1 |
| −11 | 1 + j | |
| −10 | | 13 |
| −9 | 1 − j | |
| −8 | | 5 |
| −7 | −1 + j | |
| −6 | | 17 |
| −5 | −1 − j | |
| −4 | | 9 |
| −3 | −1 + j | |
| −2 | | 21 |
| −1 | −1 + j | |
| 0 | 0 | |
| 1 | −1 − j | |
| 2 | | 2 |
| 3 | −1 − j | |
| 4 | | 14 |
| 5 | 1 + j | |
| 6 | | 6 |
| 7 | −1 − j | |
| 8 | | 18 |
| 9 | 1 − j | |
| 10 | | 10 |
| 11 | 1 + j | |
| 12 | | 22 |
| 13 | 1 − j | |
| 14 | | 3 |
| 15 | −1 + j | |
| 16 | | 15 |
| 17 | 1 − j | |
| 18 | | 7 |
| 19 | −1 − j | |
| 20 | | 19 |
| 21 | −1 − j | |
| 22 | | 11 |
| 23 | −1 − j | |
| 24 | | 23 |
| 25 | −1 + j | |
| 26 | 1 − j | |
| 27 | 0 | |
| 28 | 0 | |
| 29 | 0 | |
| 30 | 0 | |
| 31 | 0 | |

For the embodiment shown in Table 3, an S-RACH PDU includes 24 data bits that are coded and repeated to generate 96 code bits, which are transmitted on 48 data subbands in two OFDM symbols using BPSK. Table 6 shows the subband interleaving for the S-RACH. For each S-RACH PDU, interleaver 922 initially forms two groups of 48 code bits. Within each group, the 48 code bits are assigned chip indices of 0 through 47. Each code bit is then mapped to a specific data subband based on its chip index, as shown in Table 6. For example, the code bit with chip index 0 is mapped to subband −26, the code bit with chip index 1 is mapped to subband 1, the code bit with chip index 2 is mapped to subband −17, and so on.

TABLE 6

Pilot Symbols and Data Subband Interleaving for S-RACH

| Sub-band Index | Pilot Symbol p(k) | Chip Index |
|---|---|---|
| −32 | 0 | |
| −31 | 0 | |
| −30 | 0 | |
| −29 | 0 | |
| −28 | 0 | |
| −27 | 0 | |
| −26 | −1 − j | 0 |
| −25 | −1 + j | 6 |
| −24 | −1 + j | 12 |
| −23 | −1 + j | 18 |
| −22 | 1 − j | 24 |
| −21 | 1 − j | |
| −20 | 1 + j | 30 |
| −19 | −1 − j | 36 |
| −18 | −1 + j | 42 |
| −17 | 1 + j | 2 |
| −16 | −1 + j | 8 |
| −15 | 1 − j | 14 |
| −14 | 1 + j | 20 |
| −13 | 1 − j | 26 |
| −12 | 1 − j | 32 |
| −11 | −1 − j | 38 |
| −10 | −1 − j | 44 |
| −9 | 1 − j | 4 |
| −8 | −1 − j | 10 |
| −7 | 1 + j | |
| −6 | −1 + j | 16 |
| −5 | −1 − j | 22 |
| −4 | −1 + j | 28 |
| −3 | −1 + j | 34 |
| −2 | 1 − j | 40 |
| −1 | −1 + j | 46 |
| 0 | 0 | |
| 1 | 1 − j | 1 |
| 2 | −1 − j | 7 |
| 3 | −1 − j | 13 |
| 4 | −1 − j | 19 |
| 5 | −1 + j | 25 |
| 6 | 1 + j | 31 |
| 7 | −1 − j | |
| 8 | −1 + j | 37 |
| 9 | −1 − j | 43 |
| 10 | −1 − j | 3 |
| 11 | 1 + j | 9 |
| 12 | 1 − j | 15 |
| 13 | −1 + j | 21 |
| 14 | −1 − j | 27 |
| 15 | 1 + j | 33 |
| 16 | −1 + j | 39 |
| 17 | −1 + j | 45 |
| 18 | 1 − j | 5 |
| 19 | 1 + j | 11 |
| 20 | −1 + j | 17 |
| 21 | 1 + j | |
| 22 | −1 + j | 23 |
| 23 | 1 + j | 29 |
| 24 | −1 + j | 35 |
| 25 | 1 − j | 41 |
| 26 | −1 − j | 47 |
| 27 | 0 | |
| 28 | 0 | |
| 29 | 0 | |
| 30 | 0 | |
| 31 | 0 | |

Symbol mapping unit 924 maps the interleaved bits to obtain modulation symbols. In an embodiment, BPSK is used for both the F-RACH and S-RACH. For BPSK, each interleaved code bit ("0" or "1") may be mapped to a respective modulation symbol, for example, as follows: "0"⇒ −1+j0 and "1"⇒ 1+j0. The modulation symbols from unit 924 are also referred to as data symbols.

Multiplexer 926 multiplexes the data symbols with pilot symbols for each RACH PDU. The multiplexing may be performed in various manners. Specific designs for the F-RACH and S-RACH are described below.

In an embodiment, for the F-RACH, the data symbols and pilot symbols are subband multiplexed. Each F-RACH PDU includes 28 pilot symbols multiplexed with 24 data symbols, as shown in Table 5. The subband multiplexing is such that each data symbol is flanked on both sides by pilot symbols. The pilot symbols may be used to estimate the channel responses for the data subbands (e.g., by averaging the channel responses for the pilot subbands on both sides of each data subband), which can be used for data demodulation.

In an embodiment, for the S-RACH, the data symbols and pilot symbols are time division multiplexed, as shown in FIG. 3B. Each S-RACH PDU includes a pilot OFDM symbol for each of the first two symbol periods and two data OFDM symbols for the next two symbol periods. In an embodiment, the pilot OFDM symbol comprises 52 QPSK modulation symbols (or pilot symbols) for 52 subbands and signal values of zero for the remaining 12 subbands, as shown in Table 6. The 52 pilot symbols are selected to have a minimum peak-to-average variation in a waveform generated based on these pilot symbols. This characteristic allows the pilot OFDM symbol to be transmitted at a higher power level without generating an excessive amount of distortion.

The multiplexing may also be performed for the S-RACH and F-RACH based on some other schemes, and this is within the scope of the invention. In any case, multiplexer 926 provides a sequence of multiplexed data and pilot symbols (denoted as s(n)) for each RACH PDU.

Each user terminal may be equipped with one or multiple antennas. For a user terminal with multiple antennas, the RACH PDU may be transmitted from the multiple antennas using beam-steering, beam-forming, transmit diversity, spatial multiplexing, and so on. For beam-steering, the RACH PDU is transmitted on a single spatial channel associated with the best performance (e.g., the highest received SNR). For transmit diversity, data for the RACH PDU is redundantly transmitted from multiple antennas and subbands to provide diversity. The beam-steering may be performed as described below.

On the uplink, a MIMO channel formed by $N_{ut}$ terminal antennas and $N_{ap}$ access point antennas may be characterized by a channel response matrix $\underline{H}(k)$, for k∈K, where K represents the set of subbands of interest (e.g., K={−26 . . . 26}). Each matrix $\underline{H}(k)$ includes $N_{ap}N_{ut}$ entries, where entry $h_{i,j}(k)$, for i∈{1 . . . $N_{ap}$} and j∈{1 . . . $N_{ut}$}, is the coupling (i.e., complex gain) between the j-th user terminal antenna and the i-th access point antenna for the k-th subband.

The uplink channel response matrix $\underline{H}(k)$ for each subband may be "diagonalized" (e.g., using eigenvalue decomposition or singular value decomposition) to obtain the eigenmodes for that subband. A singular value decomposition of the matrix $\underline{H}(k)$ may be expressed as:

$$\underline{H}(k)=\underline{U}(k)\underline{\Sigma}(k)\underline{V}^H(k), \text{ for } k\in K, \qquad \text{Eq (3)}$$

where $\underline{U}(k)$ is an ($N_{ap} \times N_{ap}$) unitary matrix of left eigenvectors of $\underline{H}(k)$;

$\underline{\Sigma}(k)$ is an ($N_{ap} \times N_{ut}$) diagonal matrix of singular values of $\underline{H}(k)$; and $\underline{V}(k)$ is an ($N_{ut} \times N_{ut}$) unitary matrix of right eigenvectors of $\underline{H}(k)$.

The eigenvalue decomposition may be performed independently for the channel response matrix $\underline{H}(k)$ for each of the subbands of interest to determine the eigenmodes for that subband. The singular values for each diagonal matrix $\underline{\Sigma}(k)$ may be ordered such that $\{\sigma_1(k) \geq \sigma_2(k) \geq \ldots \geq \sigma_{N_s}(k)\}$, where $\sigma_1(k)$ is the largest singular value and $\sigma_{N_s}(k)$ is the smallest singular value for the k-th subband. When the singular values for each diagonal matrix $\underline{\Sigma}(k)$ are ordered, the eigenvectors (or columns) of the associated matrix $\underline{V}(k)$ are also ordered correspondingly. A "wideband" eigenmode may be defined as the set of same-order eigenmodes of all subbands after the ordering. The "principal" wideband eigenmode is the one associated with the largest singular value in each of the matrices $\underline{\Sigma}(k)$ after the ordering.

Beam-steering uses only the phase information from the eigenvectors $\underline{v}_1(k)$, for k∈K, for the principal wideband eigenmode and normalizes each eigenvector such that all elements in the eigenvector have equal magnitudes. A normalized eigenvector $\tilde{v}(k)$ for the k-th subband may be expressed as:

$$\tilde{v}(k)=[Ae^{j\theta_1(k)} Ae^{j\theta_2(k)} \ldots Ae^{j\theta_{N_{ut}}(k)}]^T, \qquad \text{Eq (4)}$$

where A is a constant (e.g., A=1); and $\theta_i(k)$ is the phase for the k-th subband of the i-th user terminal antenna, which is given as:

$$\theta_i(k) = \angle v_{1,i}(k) = \tan^{-1}\left(\frac{\text{Im}\{v_{1,i}(k)\}}{\text{Re}\{v_{1,i}(k)\}}\right). \qquad \text{Eq (5)}$$

where $\underline{v}_1(k)=[v_{1,1}(k) v_{1,2}(k) \ldots v_{1,N_{ut}}(k)]^T$.

The spatial processing for beam-steering may then be expressed as:

$$\tilde{x}(k)=\tilde{v}(k)s(k), \text{ for } k\in K, \qquad \text{Eq (6)}$$

where s(k) is the data or pilot symbol to be transmitted on the k-th subband; and $\tilde{x}(k)$ is the transmit vector for the k-th subband for beam-steering.

Figure 11:
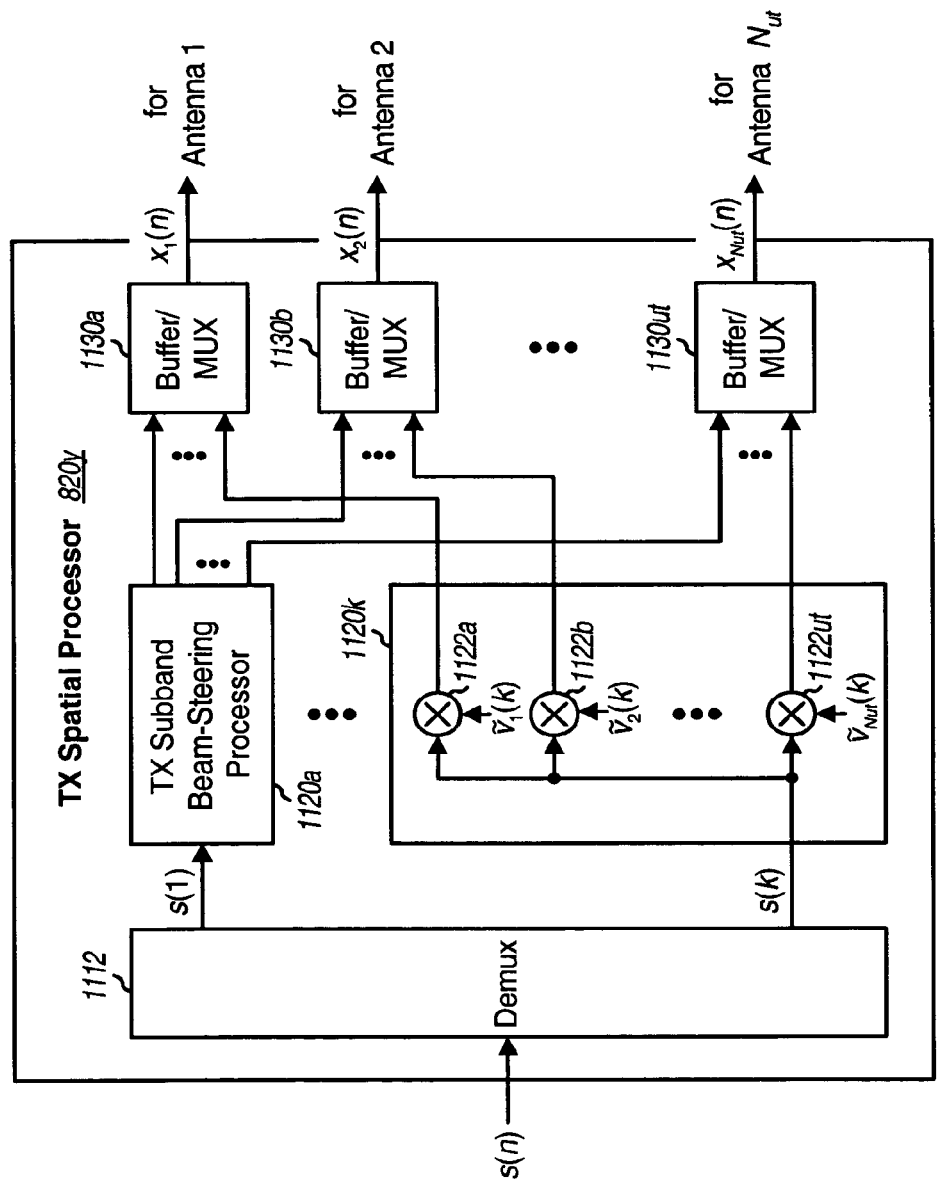
FIG. 11 shows a block diagram of a TX spatial processor within the terminal.

FIG. 11 shows a block diagram of an embodiment of TX spatial processor 820y, which performs spatial processing for beam-steering. Within processor 820y, a demultiplexer 1112 receives and demultiplexes the interleaved data and pilot symbols s(n) into K substreams (denoted as s(1) through s(k)) for the K subbands used to transmit the data and pilot symbols. Each substream includes one symbol for an F-RACH PDU and four symbols for an S-RACH PDU. Each substream is provided to a respective TX subband beam-steering processor 1120, which performs the processing shown in equation (6) for one subband.

Within each TX subband beam-steering processor 1120, the substream of symbol(s) is provided to $N_{ut}$ multipliers 1122a through 1122ut, which also respectively receive the $N_{ut}$ elements $\tilde{v}_1(k)$ through $\tilde{v}_{N_{ut}}(k)$ of the normalized eigenvector $\tilde{v}(k)$. Each multiplier 1122 multiplies each received symbol with its normalized eigenvector value $\tilde{v}_i(k)$ to provide a corresponding transmit symbol. Multipliers 1122a through 1122ut provide $N_{ut}$ transmit symbol substreams to buffers/multiplexers 1130a through 1130ut, respectively. Each buffer/multiplexer 1130 receives and multiplexes the transmit symbols from TX subband beam-steering processors 1120a through 1120k to provide a stream of transmit symbols, $x_i(n)$, for one antenna.

The processing for the beam-steering is described in further detail in the aforementioned provisional U.S. Patent Application Ser. No. 60/421,309 and in U.S. patent application Ser. No. 10/228,393, entitled "Beam-Steering and Beam-Forming for Wideband MIMO/MISO Systems," filed Aug. 27, 2002, assigned to the assignee of the present application and incorporated herein by reference. RACH PDUs may also be transmitted by multiple-antenna user terminals using transmit diversity, beam-forming, or spatial multiplexing, which are also described in the aforementioned provisional U.S. Patent Application Ser. No. 60/421,309.

FIG. 12A shows a block diagram of an embodiment of an OFDM modulator 822x, which may be used for each MOD 822 in FIG. 8. Within OFDM modulator 822x, an inverse fast Fourier transform (IFFT) unit 1212 receives a stream of transmit symbols, $x_i(n)$, and converts each sequence of 64 transmit symbols into its time-domain representation (which is referred to as a "transformed" symbol) using a 64-point inverse fast Fourier transform (where 64 corresponds to the total number of subbands). Each transformed symbol comprises 64 time-domain samples. For each transformed symbol, a cyclic prefix generator 1214 repeats a portion of the transformed symbol to form a corresponding OFDM symbol. In an embodiment, the cyclic prefix comprises 16 samples, and each OFDM symbol comprises 80 samples.

FIG. 12B illustrates an OFDM symbol. The OFDM symbol is composed of two parts: a cyclic prefix having a duration of, for example, 16 samples and a transformed symbol with a duration of 64 samples. The cyclic prefix is a copy of the last 16 samples (i.e., a cyclic continuation) of the transformed symbol and is inserted in front of the transformed symbol. The cyclic prefix ensures that the OFDM symbol retains its orthogonal property in the presence of multipath delay spread, thereby improving performance against deleterious path effects such as multipath and channel dispersion caused by frequency selective fading.

Cyclic prefix generator 1214 provides a stream of OFDM symbols to a transmitter unit (TMTR) 1216. Transmitter unit 1216 converts the OFDM symbol stream into one or more analog signals, and further amplifies, filters, and frequency upconverts the analog signal(s) to generate an uplink modulated signal suitable for transmission from an associated antenna.

5. Access Point Processing

For each TDD frame, the access point processes the F-RACH and S-RACH to detect for F/S-RACH PDUs sent by user terminals desiring to access the system. Because the F-RACH and S-RACH are associated with different designs and have different transmit timing requirements, different receiver processing techniques may be used by the access point to detect for F-RACH and S-RACH PDUs.

For the F-RACH, the transmit timing for the F-RACH PDUs are compensated for RTD and the received F-RACH PDUs are approximately aligned to F-RACH slot boundaries at the access point. A decision directed detector that operates in the frequency domain may be used to detect for F-RACH PDUs. In an embodiment, the detector processes all F-RACH slots in the F-RACH segment, one slot at a time. For each slot, the detector determines whether or not the desired signal energy for the OFDM symbol received in that slot is sufficiently high. If the answer is yes, then the OFDM symbol is further decoded to recover the F-RACH message.

For the S-RACH, the transmit timing for the S-RACH PDUs may not be compensated for RTD and the timing of the received S-RACH PDUs is not known. A sliding correlation detector that operates in the time domain may be used to detect for S-RACH PDUs. In an embodiment, the detector slides through the S-RACH segment, one sample period at a time. For each sample period, which corresponds to a hypothesis, the detector determines whether or not sufficient signal energy was received for the two pilot OFDM symbols of an S-RACH PDU hypothesized to have been received starting at that sample period. If the answer is yes, then the S-RACH PDU is further decoded to recover the S-RACH message.

Techniques for detecting and demodulating F-RACH and S-RACH transmissions are described in detail in the aforementioned U.S. Patent Application Ser. No. 60/432,626.

For clarity, the random access techniques have been described for specific designs. Various modifications may be made to these designs, and this is within the scope of the invention. For example, it may be desirable to have more than two different types of RACH for random access. Moreover, the RACH data may be processed using other coding, interleaving, and modulation schemes.

The random access techniques may be used for various wireless multiple-access communication systems. One such system is a wireless multiple-access MIMO system described in the aforementioned provisional U.S. Patent Application Ser. No. 60/421,309. In general, these systems may or may not employ OFDM, or may employ some other multi-carrier modulation scheme instead of OFDM, and may or may not utilize MIMO.

The random access techniques described herein may provide various advantages. First, the F-RACH allows certain user terminals (e.g., those that have registered with the system and can compensate for their RTDs) to quickly gain access to the system. This is especially desirable for packet data application, which is typically characterized by long periods of silence that are sporadically punctuated by bursts of traffic. Fast system access would then allow the user terminals to quickly obtain system resources for these sporadic data bursts. Second, the combination of the F-RACH and S-RACH is able to efficiently handle user terminals in various operating states and conditions (e.g., registered and unregistered user terminals, with high and low received SNRs, and so on).

The techniques described herein may be implemented by various means. For example, these techniques may be implemented in hardware, software, or a combination thereof. For a hardware implementation, the elements used to facilitate random access at the user terminal and the access point may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the random access techniques may be implemented with modules (e.g., procedures, functions, and so on) that perform the functions described herein. The software codes may be stored in a memory unit (e.g., memory units 832 and 872 in FIG. 8) and executed by a processor (e.g., controllers 830 and 870). The memory unit may be implemented within the processor or external to the processor, in which case it can be communicatively coupled to the processor via various means as is known in the art.

Headings are included herein for reference and to aid in locating certain sections. These headings are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A user terminal configured for operation in a wireless multiple-access communication system, comprising:
a receiver to receive at least one broadcast message including information regarding configuration of at least two contention-based random access channels for a frame, said at least two contention-based random access channels include a first and second contention-based random access channels;
a controller for determining an operating state of the user terminal indicating a current status of the user terminal, wherein the controller is operative to select the first contention-based random access channel and the second contention-based random access channel based on the determined operating state of the user terminal; and
a transmitter configured to transmit a first message on the first contention-based random access channel when the user terminal is in a first operating state and to transmit a second message on the second contention-based random access channel when the user terminal is in a second operating state,
wherein the first contention-based random access channel is configured for use by registered terminals for system access and the second contention-based random access channel is configured for use by registered/unregistered terminals for system access.

2. The user terminal of claim 1, wherein the controller is operative to determine the operating state of the user terminal based upon whether or not the user terminal has registered with the wireless multiple-access communication system.

3. The user terminal of claim 1, wherein the controller is operative to determine the operating state of the user terminal based upon whether or not the user terminal can compensate for propagation delay to an access point receiving messages sent by the user terminal.

4. The user terminal of claim 1, wherein the controller is operative to determine the operating state of the user terminal based upon whether or not the user terminal achieves a required received signal-to-noise ratio (SNR).

5. The user terminal of claim 1, wherein the transmitter is operative to process the first or second message to include an identifier for the user terminal.

6. The user terminal of claim 1, wherein the controller is configured to process received information corresponding to parameters conveying configuration information for at least the first and second contention-based random access channels.

7. The user terminal of claim 1, wherein the transmitter is configured to process the first or second message for transmission on a set of subbands of a plurality of subbands of the first or second contention-based random access channel.

8. The user terminal of claim 1, wherein the transmitter is operative to process the first or second message ranging from one OFDM symbol to a plurality of OFDM symbols.

9. A method of accessing a wireless communication system, the method comprising:
receiving at least one broadcast message including information regarding configuration of at least two contention-based random access channels for a frame, said at least two contention-based random access channels include first and second contention-based random access channels;
determining, by a user terminal, whether the user terminal is registered or unregistered with a wireless communication system;
selecting the first contention-based random access channel when the user terminal is determined to be registered with the wireless communication system;
selecting the second contention-based random access channel when the user terminal is determined to be unregistered with the wireless communication system; and
transmitting a message on the selected first or second contention-based random access channel.

10. The method of claim 9, wherein the message is transmitted in a manner to account for propagation delay to an access point receiving the message.

11. The method of claim 9, further comprising receiving information corresponding to parameters conveying configuration information for the first contention-based random access channel.

12. The method of claim 9, further comprising receiving an assignment, from a base station, responsive to the message.

13. The method of claim 9, wherein the message comprises a range of OFDM symbols from one to a plurality.

14. A method for operation of a user terminal in a wireless multiple-access communication system, comprising:
receiving at least one broadcast message including information regarding configuration of at least two contention-based random access channels for a frame, said at least two contention-based random access channels include first and second contention-based random access channels;
determining, by the user terminal, an operating state of the user terminal indicating a current status of the user terminal based upon whether or not the user terminal has registered with the wireless multiple-access communication system;
selecting from a group comprising the first contention-based random access channel and the second contention-based random access channel based on the determined operating state of the user terminal; and
transmitting a message on the selected first or second contention-based random access channel.

15. The method of claim 14, wherein the operating state of the user terminal is determined based upon whether or not the user terminal can compensate for propagation delay to an access point receiving messages sent by the user terminal.

16. The method of claim 14, wherein the operating state of the user terminal is determined based upon whether or not the user terminal achieves a required received signal-to-noise ratio (SNR).

17. The method of claim 14, further comprising processing the message to include an identifier for the user terminal.

18. The method of claim 14, further comprising processing received information corresponding to parameters conveying configuration information for at least the first and second contention-based random access channels.

19. The method of claim 14, further comprising processing the message for transmission on a set of subbands of a plurality of subbands of the first or second contention-based random access channel.

20. The method of claim 14, further comprising processing the message ranging from one OFDM symbol to a plurality of OFDM symbols.

21. A user terminal for accessing a wireless communication system, comprising:
- a receiver for receiving at least one broadcast message including information regarding configuration of at least two contention-based random access channels for a frame, said at least two contention-based random access channels include first and second contention-based random access channels;
- a controller configured to determine whether the user terminal is registered or unregistered with the wireless communication system, wherein the controller is operative to select the first contention-based random access channel to access the wireless communication system when the user terminal is determined to be registered with the wireless communication system and the second contention-based random access channel to access the wireless communication system when the user terminal is determined to be unregistered with the wireless communication system; and
- a transmitter for transmitting a message on the first or second selected contention-based random access channel.

22. The user terminal of claim 21, wherein the message is transmitted in a manner to account for propagation delay to an access point receiving the message.

23. The user terminal of claim 21, further comprising a receiver for receiving information corresponding to parameters conveying configuration information for the first contention-based random access channel.

24. The user terminal of claim 21, further comprising a receiver for receiving an assignment, from a base station, responsive to the message.

25. The user terminal of claim 21, wherein the message comprises a range of OFDM symbols from one to a plurality.

* * * * *